(12) United States Patent
Hickey et al.

(10) Patent No.: US 10,714,783 B2
(45) Date of Patent: Jul. 14, 2020

(54) INTEGRATED FUEL CELL SYSTEMS

(71) Applicant: CUMMINS ENTERPRISE LLC, Indianapolis, IN (US)

(72) Inventors: Darren Bawden Hickey, Halfmoon, NY (US); Irfan Saif Hussaini, Glenville, NY (US); Andrew Philip Shapiro, Schenectady, NY (US); Keith Garrette Brown, Clifton Park, NY (US)

(73) Assignee: CUMMINS ENTERPRISE LLC, Indianapolis, IN (US)

( * ) Notice: Subject to any disclaimer, the term of this patent is extended or adjusted under 35 U.S.C. 154(b) by 133 days.

(21) Appl. No.: 15/590,157

(22) Filed: May 9, 2017

(65) Prior Publication Data

US 2018/0331385 A1    Nov. 15, 2018

(51) Int. Cl.
*H01M 8/249*        (2016.01)
*H01M 8/0662*       (2016.01)
(Continued)

(52) U.S. Cl.
CPC ....... *H01M 8/249* (2013.01); *H01M 8/04014* (2013.01); *H01M 8/0625* (2013.01);
(Continued)

(58) Field of Classification Search
CPC .......... H01M 8/2465; H01M 8/04007; H01M 8/04716; H01M 8/249; H01M 8/2475;
(Continued)

(56) References Cited

U.S. PATENT DOCUMENTS 4,407,903 A * 10/1983 Gutbier ................. B63H 21/17
                                                      429/430
5,640,494 A    6/1997 Jabri et al.
(Continued)

FOREIGN PATENT DOCUMENTS

CN        104517284        4/2015
CN        104914851        9/2015
(Continued)

OTHER PUBLICATIONS

Selimovic et al., "Networked solid oxide fuel cell stacks combined with a gas turbine cycle", Journal of Power Sources, vol. 106, Issue: 1-2, pp. 76-82, Apr. 1, 2002.
(Continued)

*Primary Examiner* — Gregg Cantelmo
(74) *Attorney, Agent, or Firm* — Barnes & Thornburg LLP

(57) ABSTRACT

A system includes a first plurality of fuel cell stacks configured to generate a first portion of an electric potential and a second plurality of fuel cell stacks configured to generate a second portion of the electric potential. The system includes a positive electrical bus bar conductively coupled with the first plurality of fuel cell stacks and configured to power an electrical load using the generated electric potential. The system includes a negative electrical bus bar conductively coupled with the second plurality of fuel cell stacks and configured to electrical load using the generated electric potential. The positive electrical bus bar is elongated and extends between the first plurality of fuel cell stacks and the negative electrical bus bar is elongated and extends between the second plurality of fuel cell stacks.

15 Claims, 10 Drawing Sheets

(51) Int. Cl.
H01M 8/04014 (2016.01)
H01M 8/0612 (2016.01)
H01M 8/2475 (2016.01)
H01M 8/2484 (2016.01)

(52) U.S. Cl.
CPC ....... H01M 8/0662 (2013.01); H01M 8/2484 (2016.02); *H01M 8/2475* (2013.01)

(58) Field of Classification Search
CPC ........... H01M 8/2484; H01M 8/04014; H01M 8/0625; H01M 8/0662
See application file for complete search history.

(56) References Cited

U.S. PATENT DOCUMENTS

| | | |
|---|---|---|
| 5,659,666 A | 8/1997 | Thaler |
| 6,548,197 B1 | 4/2003 | Chandran et al. |
| 6,692,859 B2* | 2/2004 | Mukerjee ............ H01M 8/2415 429/410 |
| 6,942,942 B2 | 9/2005 | Haltiner, Jr. et al. |
| 7,369,682 B2 | 5/2008 | Yang et al. |
| 7,749,628 B2 | 7/2010 | Pastula et al. |
| 7,809,300 B2 | 10/2010 | Saeki et al. |
| 7,945,101 B2 | 5/2011 | Chen et al. |
| 7,995,810 B2 | 8/2011 | Li et al. |
| 8,026,013 B2 | 9/2011 | Valensa et al. |
| 8,137,855 B2 | 3/2012 | Weingaertner et al. |
| 8,202,656 B2 | 6/2012 | Pastula et al. |
| 8,268,491 B1 | 9/2012 | Pastula et al. |
| 8,406,525 B2 | 3/2013 | Ma et al. |
| 9,343,758 B2 | 5/2016 | Poshusta et al. |
| 9,373,862 B2 | 6/2016 | Kah et al. |
| 9,520,602 B2 | 12/2016 | Venkataraman et al. |
| 2003/0096147 A1 | 5/2003 | Badding et al. |
| 2004/0157110 A1* | 8/2004 | Knights ............ H01M 4/8605 429/432 |
| 2006/0152085 A1* | 7/2006 | Flett .......................... B60L 9/30 307/75 |
| 2008/0107933 A1* | 5/2008 | Gallagher ......... H01M 8/04619 429/431 |
| 2009/0053569 A1* | 2/2009 | Perry ................ H01M 8/04007 429/408 |
| 2010/0047641 A1* | 2/2010 | Jahnke .............. H01M 8/04291 429/415 |
| 2010/0173213 A1 | 7/2010 | Lange et al. |
| 2010/0183217 A1 | 7/2010 | Seung et al. |
| 2011/0256463 A1* | 10/2011 | Michalske .............. H01M 8/02 429/465 |
| 2014/0072889 A1* | 3/2014 | McElroy ............ H01M 8/0606 429/411 |
| 2016/0048741 A1 | 2/2016 | Nguyen et al. |
| 2016/0111749 A1 | 4/2016 | Wang et al. |

FOREIGN PATENT DOCUMENTS

| | | |
|---|---|---|
| CN | 105512289 | 4/2016 |
| CN | 105551036 | 5/2016 |
| WO | 2014205231 | 12/2014 |

OTHER PUBLICATIONS

Cho et al., "Image Segmentation from Consensus Information", Computer vision and image understanding, vol. 58, Issue: 1, pp. 72-89, 1997.

Huang et al., "QualityNet: Segmentation quality evaluation with deep convolutional networks", 2016 Visual Communications and Image Processing (VCIP), pp. 1-4, 2016, Chengdu.

Xia et al., "Adversarial Examples Generation and Defense Based on Generative Adversarial Network", pp. 1-6, Dec. 15, 2016.

Narodytska et al., "Simple black-box adversarial perturbations for deep networks", pp. 1-18, 2017.

Warde-Farley et al., "Adversarial Perturbations of Deep Neural Networks", pp. 1-34.

Roberto Capata, "An artificial neural network-based diagnostic methodology for gas turbine path analysis—part II: case study", Energy, Ecology and Environment, vol. 1, Issue: 6, pp. 351-359, Dec. 2016.

Ian J. Goodfellow et al, "Generative Adversarial Nets", D'epartement d'informatique et de recherche op'erationnelle Universit'e de Montr'eal Montr'eal, QC H3C 3J7, Jun. 10, 2014, pp. 1-9.

Convolutional Neural Networks (CNNs /ConvNets), "CS231n Convolutional Neural Networks for Visual Recognition", http://cs231n.github.io/convolutional-networks/, pp. 1-26.

* cited by examiner

INTEGRATED FUEL CELL SYSTEMS

FIELD

The subject matter described herein generally relates to fuel cell systems.

BACKGROUND

Fuel cells are electrochemical energy conversion devices that have demonstrated a potential for relatively high efficiency and low pollution in power generation. A fuel cell generally provides a direct current (dc) which may be converted to alternating current (ac) via, for example, an inverter. The dc or ac voltage can be used to power motors, lights, communication equipment and any number of electrical devices and systems. Fuel cells may operate in stationary, semi-stationary, or portable applications. Certain fuel cells, such as SOFCs, may operate in large-scale power systems that provide electricity to satisfy industrial and municipal needs. Others may be useful for smaller portable applications such as, for example, powering cars.

A fuel cell produces electricity by electrochemically combining a fuel and an oxidant across an ionic conducting layer. This ionic conducting layer, also labeled the electrolyte of the fuel cell, may be a liquid or solid. Common types of fuel cells include phosphoric acid (PAFC), molten carbonate (MCFC), proton exchange membrane (PEMFC), and solid oxide (SOFC), all generally named after their electrolytes. In practice, fuel cells are typically amassed in electrical series in an assembly of fuel cells to produce power at useful voltages or currents.

In general, components of a fuel cell include the electrolyte and two electrodes. The reactions that produce electricity generally take place at the electrodes where a catalyst is typically disposed to speed the reactions. The electrodes may be constructed as channels, porous layers, and the like, to increase the surface area for the chemical reactions to occur. The electrolyte carries electrically charged particles from one electrode to the other and is otherwise substantially impermeable to both fuel and oxidant.

Typically, the fuel cell converts hydrogen (fuel) and oxygen (oxidant) into water (byproduct) to produce electricity. The byproduct water may exit the fuel cell as steam in high-temperature operations. This discharged steam (and other hot exhaust components) may be utilized in turbines and other applications to generate additional electricity or power, providing increased efficiency of power generation. If air is employed as the oxidant, the nitrogen in the air is substantially inert and typically passes through the fuel cell. Hydrogen fuel may be provided via local reforming (e.g., on-site steam reforming) or remote reforming of carbon-based feedstocks, such as reforming of the more readily available natural gas and other hydrocarbon fuels and feedstocks. Examples of hydrocarbon fuels include, but are not limited to, natural gas, methane, ethane, propane, methanol, and other hydrocarbons.

Fuel cell systems include many components to transfer heat between streams of fuel, to transfer heat between streams of air, to transfer heat between streams of air and streams of fuel, to reform the fuel, and to oxidized the discharged effluent from the fuel cells. These components typically are separate and spatially distributed apart from each other. Additionally, fuel pipelines and oxygen pipelines that are used to supply fuel and oxygen to conventional fuel cell systems are typically joined with the system within a hotbox or a high temperature portion of the system. Additionally, the fuel pipelines, the oxygen pipelines as well as the conduits needed to direct fuel and air exhaust out of the fuel cells are typically separated from each other. A significant amount of conduits (e.g., in terms of the number of conduits and/or the total length of the conduits) may be needed to fluidly couple the components with the fuel pipelines, the oxygen pipelines, the fuel exhaust conduits, and the air exhaust conduits. As the amount of conduits needed increases, the amount of heat loss from the fuel and/or air flowing through the conduits increases. As a result, the conduits may need to be fabricated from more thermally insulative (and, therefore, more expensive) materials and/or additional heating components may need to be added to the system. This increases the cost, the footprint, and complexity of the fuel cell systems and decreases the opportunity scale up and/or scale down the size of the fuel cell systems.

BRIEF DESCRIPTION

In one embodiment, a system includes one or more positive fuel cell stacks configured to generate a positive portion of an electric potential and one or more negative fuel cell stacks configured to generate a negative portion of the electric potential. The system includes a positive electrical bus bar conductively coupled with the one or more positive fuel cell stacks and configured to conduct the positive portion of the electric potential from the one or more positive fuel cell stacks to one or more loads. The system includes a negative electrical bus bar conductively coupled with the one or more negative fuel cell stacks and configured to conduct the negative portion of the electric potential from the one or more negative fuel cell stacks to the one or more loads. The positive electrical bus bar is elongated and extends between the one or more positive fuel cell stacks and the negative electrical bus bar is elongated and extends between the one or more negative fuel cell stacks.

In one embodiment, a method includes generating a positive portion of an electric potential with one or more positive fuel cell stacks and generating a negative portion of the electric potential with one or more negative fuel cell stacks. The method includes conducting the positive portion of the electric potential from the one or more positive fuel cell stacks to one or more loads with a positive electrical bus bar conductively coupled with the one or more positive fuel cell stacks, wherein the positive electrical bus bar is elongated and extends between the one or more positive fuel cell stacks. The method includes conducting the negative portion of the electric potential from the one or more negative fuel cell stacks to the one or more loads with a negative electrical bus bar conductively coupled with the one or more negative fuel cell stacks, wherein the negative electrical bus bar is elongated and extends between the one or more negative fuel cell stacks.

In one embodiment, a system includes one or more positive fuel cell stacks configured to generate a positive portion of an electric potential and one or more negative fuel cell stacks configured to generate a negative portion of the electric potential. The system includes a positive electrical bus bar conductively coupled with the positive fuel cell stacks and configured to conduct the positive portion of the electric potential from the one or more positive fuel cell stacks to one or more loads. The system includes a negative electrical bus bar conductively coupled with the one or more negative fuel cell stacks and configured to conduct the negative portion of the electric potential from the one or more negative fuel cell stacks to the one or more loads. The positive electrical bus bar is elongated and extends between the one or more positive fuel cell stacks and the negative electrical bus bar is elongated and extends between the one or more negative fuel cell stacks. The positive electrical bus bar and the negative electrical bus bar are configured to be conductively coupled with a common load of the one or more loads and are configured to conduct the positive portion and the negative portion of the electric potential to the common load.

BRIEF DESCRIPTION OF THE DRAWINGS

The inventive subject matter will be better understood from reading the following description of non-limiting embodiments, with reference to the attached drawings, wherein below.

DETAILED DESCRIPTION

One or more embodiments of the inventive subject matter described herein provides for fuel cell systems and methods that are capable of conducting the generated positive portion of the electric potential of the system with a single positive direct current bus bar, and conducting the generated negative portion of the electric potential of the system with a single negative direct current bus bar to a common load. This results in fewer components needed for the electrical system of the system (e.g., inverters) to convert the DC voltage to AC relative to conventional systems.

One or more embodiments include one or more positive fuel cell stacks that generate the positive portion of the electric potential arranged in a linear array, and include one or more negative fuel cell stacks that generate the negative portion of the electric potential arranged in a linear array, with the fuel and air inlet and outlet passages positioned at a first end of the linear arrays of the fuel cell stacks. This results in the ability to scale up the system (e.g., add more positive and negative fuel cell stacks) or scale down the system (e.g., remove positive and negative fuel cell stacks) while reducing the amount of additional conduits needed to add more positive and negative fuel cell stacks to the system.

One or more embodiments of the inventive subject matter described herein provides an integrated fuel cell system that includes stage one blocks having positive and negative fuel cell stacks integrated with reformers and tail gas oxidizers and includes minimal fluid and electrical connections between the stage one blocks and a stage two block relative to some known fuel cell systems. This integration is permissible due to changes in the paths that fuel and/or air flow within the fuel cell system, which allows for various components of the fuel cell system to be located closer together. This results in fewer and shorter conduits being needed to fluidly couple components of the fuel cell system. Consequently, less heat loss in the fuel and/or air flowing through the fuel cell system occurs, and the cost and complexity of the fuel cell system is decreased (relative to some other fuel cell systems).

Figure 1:
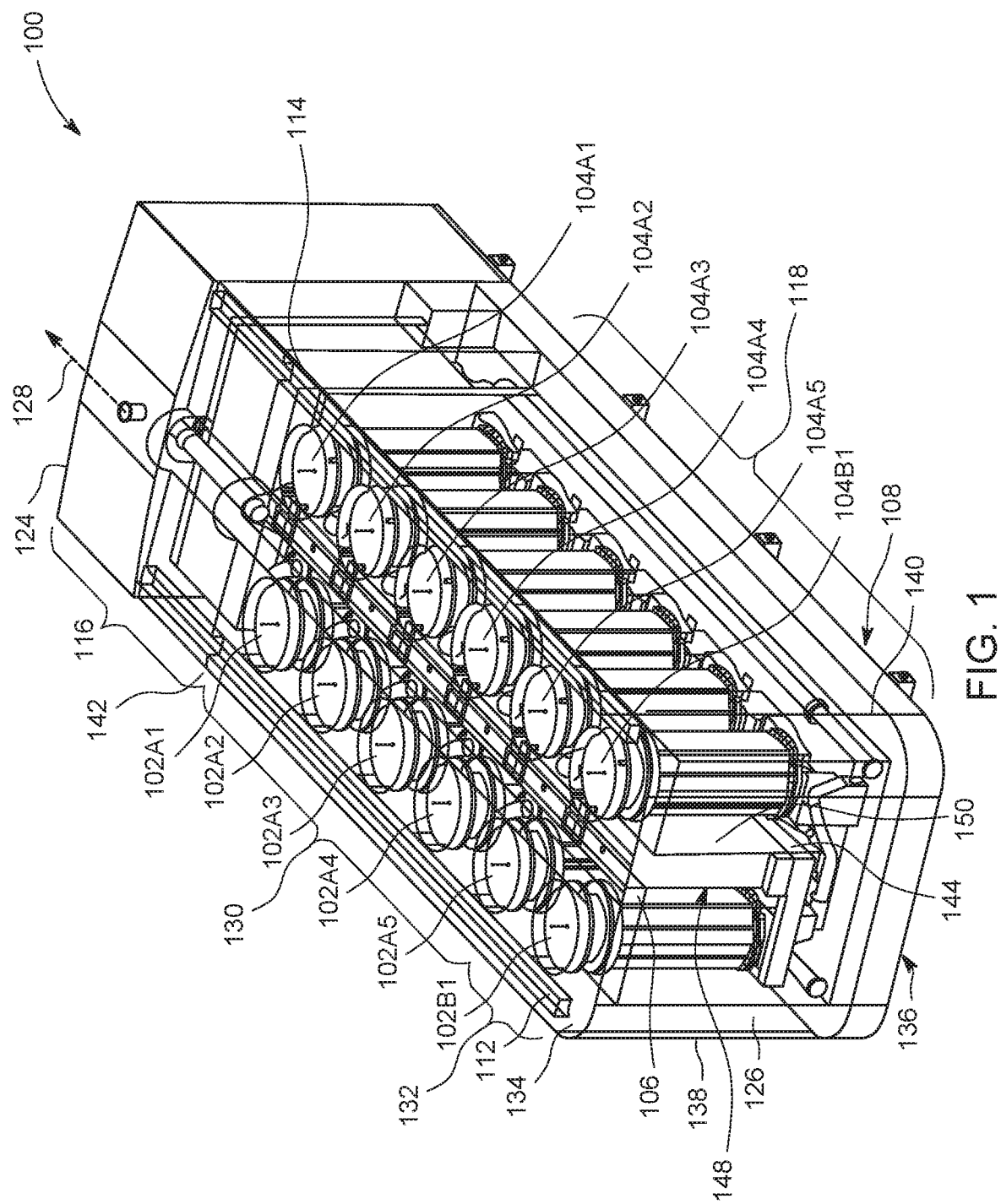
FIG. 1 illustrates a perspective view of a fuel cell system in accordance with one embodiment.

FIG. 1 illustrates a perspective view of a fuel cell system 100 in accordance with one embodiment. The system 100 includes a system housing 108 that has a generally rectangular cross-sectional shape that extends between a top side 134 and a bottom side 136 and between a first side 138 and a second side 140. For example, the bottom side 136 may be disposed close to the ground, a mounting platform, or the like, relative to the top side 134. The system housing 108 is elongated along an axis 128 between a first end 124 and a second end 126. The first and second sides 138, 140 may extend a length of about 20 feet (about 6 meters) between the first end 124 and the second end 126 in a direction along the axis 128. Additionally, the first and second ends 124, 126 may extend a length of about 9 feet (e.g., about 3 meters) between the first and second sides 138, 140, and the first and second ends 124, 126 may extend a length of about 7 feet (e.g., about 2 meters) between bottom side 136 and the top side 134. For example, the system housing 108 is substantially cubed in shape with a footprint of about 800 square-feet (e.g., about 75 square-meters). Alternatively, the system housing 108 may be any alternative cross-sectional shape and may have a footprint that is larger than or smaller than 800 square-feet.

The system 100 includes a base 116 and a system hotbox 118 that are contained within the system housing 108. The base 116 is disposed closer to the first end 124 relative to the system hotbox 118. Alternatively, the base 116 may be disposed at a location outside of the system housing 108. The hotbox 118 is an insulated compartment within the housing 108 that extends internally between the second end 126 and an end wall 142 along the axis 128. The base 116 is an insulated compartment within the housing 108 that extends internally between the end wall 142 and the first end 124 of the housing 108 along the axis 128. Operation and components within the base 116 will be described in more detail below.

The system 100 has a conduit spine 106 that has a generally rectangular cross-sectional shape and is elongated along the axis 128 between the end wall 142 and the second end 126 within the hotbox 118. Alternatively, the conduit spine 106 may have any alternative cross-sectional shape. The conduit spine 106 has one or more conduits that are fluidly coupled with one or more components within the base 116 in order to direct air, fuel, or the like, from the base 116 to one or more systems or components within the hotbox 118.

The system 100 has one or more positive fuel cell stacks 102 and one or more negative fuel cell stacks 104 that are disposed within the hotbox 118 of the housing 108. The fuel cell stacks 102, 104 can represent one or more stacks of fuel cells, such as a solid oxide fuel cell (SOFC) or another type of fuel cell. The positive fuel cell stacks 102 are disposed on a first side 148 of the conduit spine 106 within the hotbox 118 and are arranged in a linear array between the end wall 142 and the second end 126 in a direction substantially parallel to the axis 128. The positive fuel cell stacks 102 generate a positive portion of electric potential of the system 100. The positive fuel cell stacks 102 are conductively coupled with a positive electrical bus bar 112 that extends from the base 116 a direction generally towards the second end 126 into the hotbox 118. The positive portion of the electric potential is conducted from the positive fuel cell stacks 102 to the one or more loads within the base 116 via the positive electrical bus bar 112. For example, the positive fuel cell stacks 102 provide the positive portion of a direct current (DC). The positive electrical bus bar 112 may conduct the positive portion of the DC to one or more loads in the base 116 in which the DC voltage which may be converted to alternating current (AC) via, for example, an inverter.

The negative fuel cell stacks 104 are disposed on an opposite, second side 150 of the conduit spine 106 within the hotbox 118 and are arranged in a linear array between the end wall 142 and the second end 126 in a direction generally parallel to the axis 128. The negative fuel cell stacks 104 generate a negative portion of electric potential of the system 100. The negative fuel cell stacks 104 are conductively coupled with a negative electrical bus bar 114 that extends from the base 116 a direction generally towards the second end 126 into the hotbox 128. The negative portion of the electric potential is conducted from the negative fuel cell stacks 104 to the one or more loads within the base 116 via the negative electrical bus bar 114. For example, the negative fuel cell stacks 104 provide the negative portion of a direct current (DC). The negative electrical bus bar 114 may conduct the negative portion of the DC to one or more loads in the base 116 in which the DC voltage which may be converted to alternating current (AC) via, for example, the inverter.

The positive and negative fuel cell stacks 102, 104 are separated into stage one blocks 130 and a stage two block 132. The stage one blocks 130 include a first portion of the positive and negative fuel cell stacks 102, 104, and the stage two block 132 contains a second portion of the positive and negative fuel cell stacks 102, 104. For example, the stage one blocks include pairs of five positive fuel cell stacks 102A1-5, and five negative fuel cell stacks 104A1-5. Optionally, the stage one blocks 130 may include less than five or more than five pairs of fuel cell stacks 102A1-5, 104A1-5. The stage two block 132 includes a pair of the positive fuel cell stack 102B1 and the negative fuel cell stack 104B1. The pairs of positive and negative fuel cell stacks (e.g., 102A1 and 104A1, or 102A2 and 104A2) generate equal or substantially equivalent positive portions and negative portions of the electric potential of the system 100. In the illustrated embodiment, the positive and negative fuel cell stacks 102B1, 104B1 of the stage two block (e.g., the second portion of the positive and negative fuel cell stacks 102, 104) are disposed near the second end 126 of the housing 108 relative to the stage one blocks 102A, 104A (e.g., the first portion of the positive and negative fuel cell stacks 102, 104). Alternatively, the pair of fuel cell stacks of the stage two block 132 may be positioned in an alternative location. For example, the positive stage two block 102B1 may be moved to a location between the positive fuel cell stacks 102A2 and 102A3, and the negative stage two block 104B1 may be moved between the positive fuel cell stacks 104A2 and 104A3. The fluidly coupled stage one blocks 130 and the stage two block 132 will be discussed in more detail below.

Figure 2:
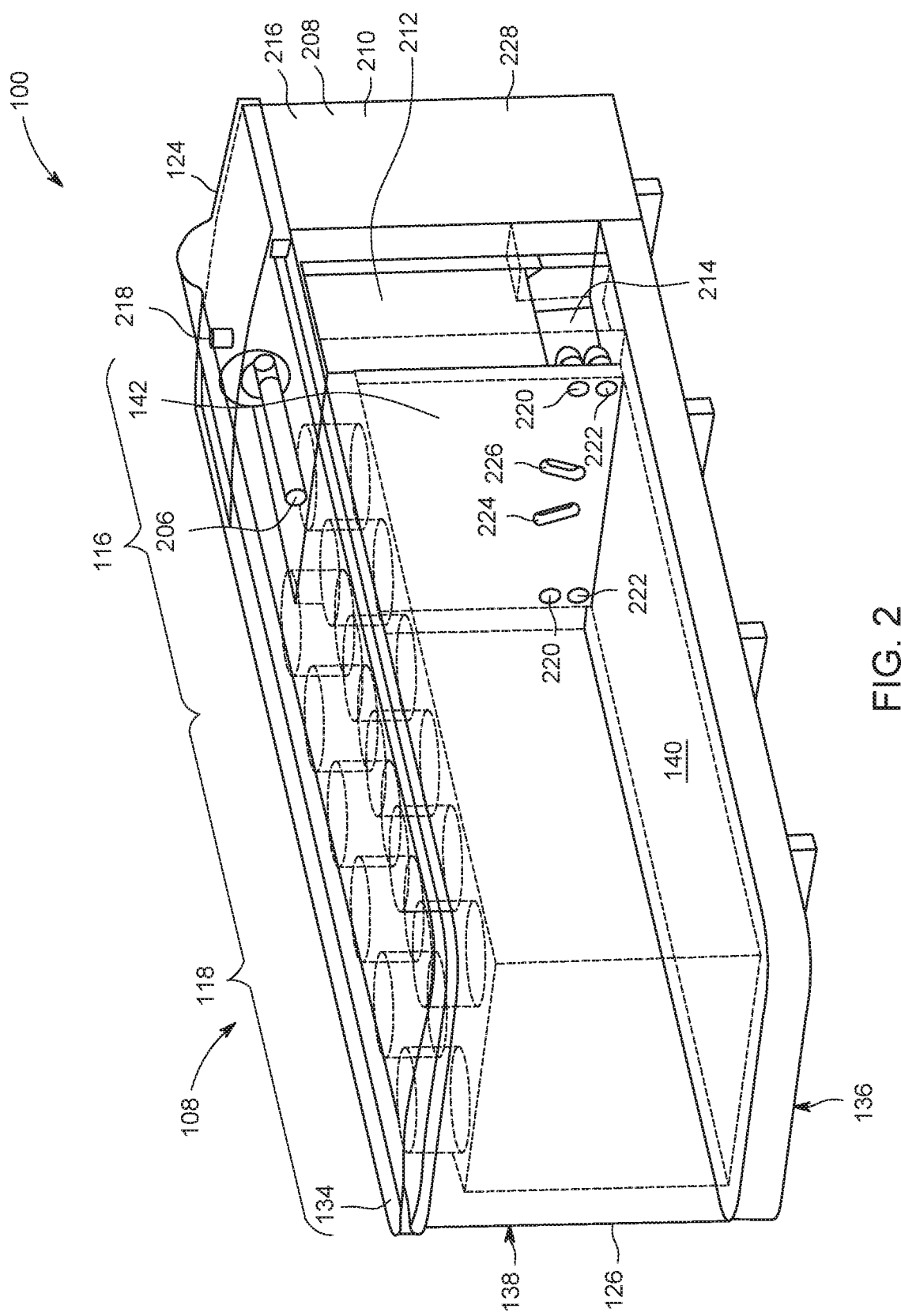
FIG. 2 illustrates a perspective view of a housing of the fuel cell system of FIG. 1 in accordance with one embodiment.

FIG. 2 illustrates another perspective view of the system 100. In the illustrated embodiment, the components within the hotbox 118 have been removed relative to FIG. 1. The base 116 includes components and/or systems that are fluidly coupled with one or more components or systems within the hotbox 118 of the system 100. For example, the base 116 includes a low temperature air heat exchanger 212, a low temperature fuel heat exchanger 214, one or more coolers 216, one or more fuel blowers 208, one or more air blowers 210, an exhaust 206 and the like. The end wall 142 includes one or more passages that are open between the base 116 and the hotbox 118 in order to fluidly couple one or more components within the hotbox 118 with one or more components or systems within the base 116. For example, the end wall 142 includes one or more fuel inlet passages 220, one or more fuel outlet passages 222, an oxidizer fuel passage 224, an oxidizer air passage 226, and the like, that are open passages between the hotbox 118 and the base 116. The base 116 also includes a housing exhaust 218 that directs exhaust from inside the system housing 108 to outside of the system 100.

Figure 3:
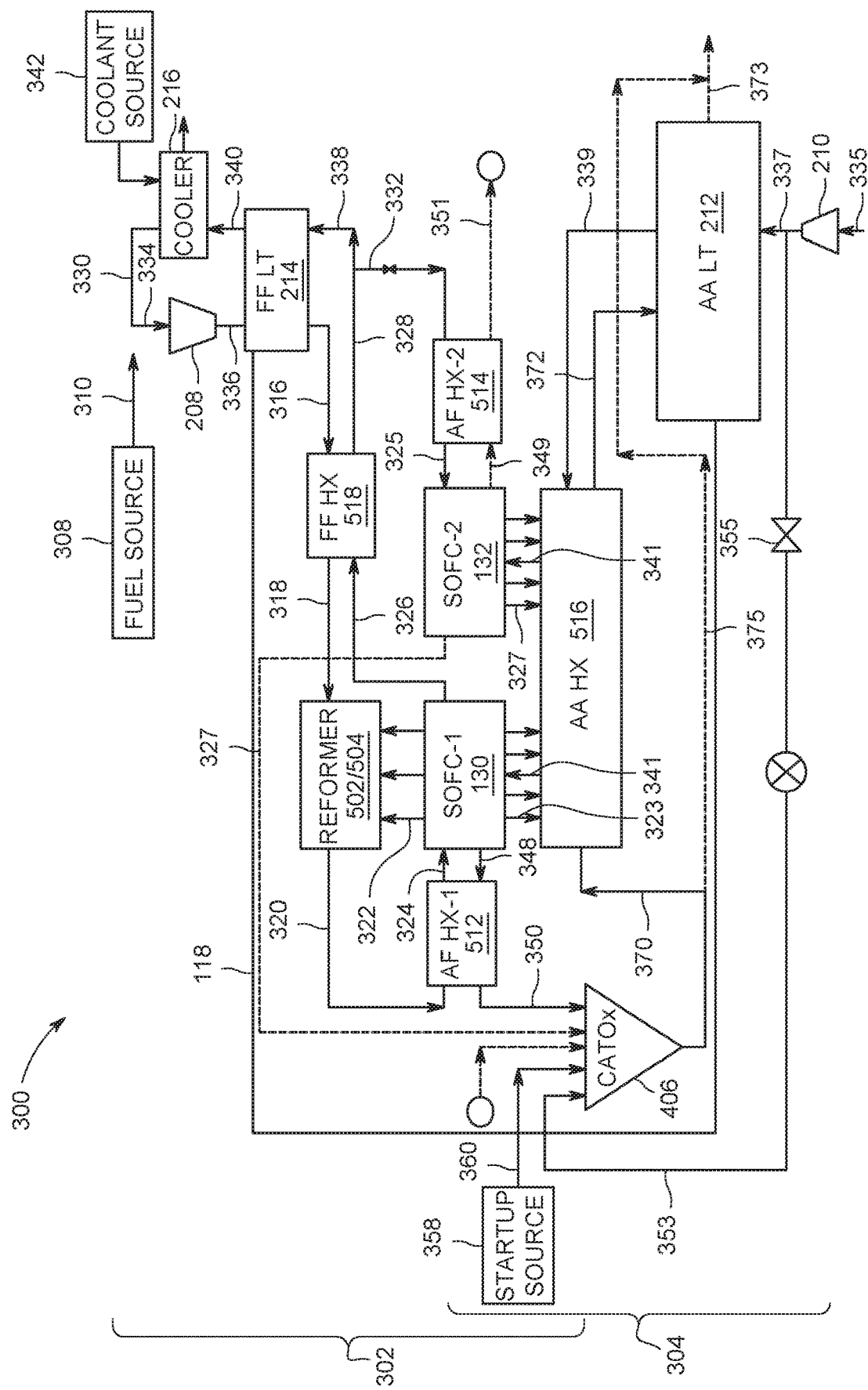
FIG. 3 illustrates a flow diagram of one embodiment of the fuel cell system of FIG. 1 in accordance with one embodiment.

With reference to FIGS. 1 and 2, FIG. 3 illustrates a flow diagram 300 of one embodiment of the system 100. Operation and components of the system 100 illustrated in FIGS. 1 and 2 are described in connection with how fuel and air flow through the system 100. Fuel flows in the system 100 along or in a fuel flow cycle 302 and air flows in the system 100 along or in an airflow cycle 304. The flow cycles 302, 304 represent directions and paths in which fuel and air respectively flow through the various components of the system 100 in order to be heated, exchange heat, be reformed, and be provided to one or more of the fuel cell stacks 102, 104 in order to generate electric current.

With respect to the fuel flow cycle 302, fuel is input into the system 100 from a source 308 of the fuel ("Fuel Source" in FIG. 3) that is located outside of the hotbox 118. The fuel source 308 may be located in the base 116, at an alternative location inside of the system housing 108, at a location outside of the system housing 108, or the like. This source 308 can represent one or more containers of a hydrogen-containing substance, such as natural gas. The fuel provided by the source 308 and input into the system 100 may be referred to as source input fuel 310. For example, the positive and negative fuel cell stacks 102, 104, that are disposed within the hotbox 118, receive the input fuel 310 from the source 308 located outside of the hotbox 118. The source input fuel 310 is mixed with cooler output fuel 330 exiting from the cooler 216 to form mixed input fuel 334, as described in more detail below.

The mixed input fuel 334 is received into the fuel blower 208 partially or fully disposed within the base 116, which can represent a fan or other device that moves the fuel through the fuel flow cycle 302. The mixed input fuel 334 is recirculated into the fuel flow cycle 302 by the fuel blower 208. For example, the positive and negative fuel cell stacks 102A1-5, 104A1-5 of the stage one blocks 130 may be fluidly coupled with the fuel blower 208 such that the fuel blower 208 directs fuel exhaust from the positive and negative fuel cell stacks of the stage one blocks 130 (e.g., the first portion remaining output fuel 338) back into the positive and negative fuel cell stacks of the stage one blocks 130. In the illustrated embodiment of FIG. 3, a single fuel blower 208 directs fuel exhaust back into the positive and negative fuel cell stacks of the stage one blocks 130. Optionally, the system 100 may have two or more fuel blowers that direct fuel exhaust into the fuel cycle 302. The mixed input fuel 334 may move through the blower 208 having a temperature that is greater than 100° C. and/or that is less than 200° C.

Blown input fuel 336 is received into a low temperature fuel heat exchanger 214 ("FF LT" in FIG. 3) partially or fully disposed within the base 116. In the low temperature fuel heat exchanger 214, the blown input fuel 336 is heated. The blown input fuel 336 receives heat from remaining output fuel 338 in the low temperature fuel heat exchanger 214, which is fuel output by a high temperature fuel heat exchanger 518 ("FF HT" in FIG. 3). In one embodiment, the temperature of the blown input fuel 336 may be increased by the low temperature fuel heat exchanger 214 such that the temperature of the blown input fuel 336 is at least doubled. For example, the temperature of the blown input fuel 336 may be increased from a temperature of around 200° C. to a temperature in excess of 400° C., such as 500° C. or 600° C. The blown input fuel 336 is heated and output from the low temperature fuel heat exchanger 214 as heated input fuel 316

The heated input fuel 316 is then received into the high temperature fuel heat exchanger 518. For example, the heated input fuel 316 may be directed into the high temperature fuel heat exchanger 518 by a fuel inlet header that passes through the fuel inlet passage 220 of the end wall 142 (of FIG. 2) between the base 116 and the hotbox 118. The high temperature fuel heat exchanger 518 increases the temperature of the heated input fuel 316 from thermal energy input heating fuel 326 that is received by the high temperature fuel heat exchanger 518 from the positive and negative fuel cell stacks 102, 104 of the stage one blocks 130 of FIG. 1. For example, the high temperature fuel heat exchanger 518 exchanges heat between fuel directed into positive and negative fuel cell stacks of the stage one blocks 130 and fuel exhaust that is output by positive and negative fuel cell stacks of the stage one blocks 130. Similar to the low temperature fuel heat exchanger 214, the high temperature fuel heat exchanger 518 transfers heat (e.g., thermal energy) from the hotter heating fuel 326 to the cooler heated input fuel 316. The temperature of the heated input fuel 316 is increased in the high temperature fuel heat exchanger 518 and output as increased temperature fuel 318.

In one embodiment, the increase in temperature of the heated input fuel 316 to the increased temperature fuel 318 is less than the increase in temperature from the blown input fuel 336 to the heated input fuel 316. For example, the low temperature fuel heat exchanger 214 may more than double the temperature of the blown input fuel 336 while the high temperature fuel heat exchanger 518 increases the temperature of the heated input fuel 316 by a lesser amount. The high temperature fuel heat exchanger 518 can increase the heated input fuel 316 from a temperature of about 400° C. to a temperature of the increased temperature fuel 318 that is at least 700° C.

The increased temperature fuel 318 that is output from the high temperature fuel heat exchanger 518 is received by reformers 502, 504 that reform the increased temperature fuel 318. For example, the reformer 502 may be a first reformer that is fluidly coupled with a positive fuel cell stack 102 of FIG. 1, and the reformer 504 may be a second reformer that is fluidly coupled with a negative fuel cell stack 104 of FIG. 1. The reformers 502, 504 are disposed within the system 100 close to or near to the stage one blocks 130 in order to absorb heat 322 (e.g., thermal energy) from the stage one blocks 130. For example, the first reformers 502 receive heat from the positive fuel cell stacks 102A1-5 of the stage one blocks 130, and the second reformers 504 receive heat from the negative fuel cell stacks 104A1-5 of the stage one blocks 130. The arrangement of the reformers 502, 504 disposed close to the fuel cell stacks within the hotbox 118 will be discussed in more detail below. The increased temperature fuel 318 is reformed by the reformers 502, 504 and output from the reformers 502, 504 as reformed fuel 320.

The reformed fuel 320 that is output from the reformers 502, 504 is directed to a first air fuel heat exchanger 512 ("AF HX-1" in FIG. 3). In the first air fuel heat exchanger 512, the reformed fuel 320 is heated. The reformed fuel 320 receives heat from stack one output air 348 of the air flow cycle 304 (described in more detail below). The first air fuel heat exchanger 512 transfers heat (e.g., thermal energy) from the hotter stack one output air 348 to the cooler reformed fuel 320. For example, the first air fuel heat exchanger 512 exchanges heat between the fuel directed into the positive and negative fuel cell stacks of the stage one blocks 130 (e.g., the reformed fuel 320) and the air exhaust that is output by the positive and negative fuel cell stacks of the stage one blocks 130 (e.g., stack one output air 348). The temperature of the reformed fuel 320 is increased in the first air fuel heat exchanger 512, and is output as heated reformed fuel 324. For example, the temperature of the reformed fuel 320 may be increased from a temperature around 550° C. to a temperature around 700° C. Additionally, temperature of the stack one output air 348 is decreased in the first air fuel heat exchanger 512 and is output as cooled stack one output air 350. For example, the temperature of the stack one output air 348 may be decreased from a temperature around 810° C. to a temperature around 750° C.

The heated reformed fuel 324 is directed to the one or more positive and negative fuel cell stacks 102, 104 of the stage one blocks 130. The fuel cells of the stage one blocks 130 consume at least part of the reformed fuel 320 in the generation of the electric current. For example, the positive fuel cell stacks 102A1-5 of the stage one blocks 130 generate the positive portion of the electric potential of the system 100, and the negative fuel cell stacks 104A1-5 of the stage one blocks 130 generate the negative portion of the electric potential of the system 100. The fuel that is not consumed by the fuel cell stacks of the stage one blocks 130 is output from the stage one blocks 130 as the heating fuel 326. The heating fuel 326 may have an increased temperature relative to the heated reformed fuel 324 that is input into the fuel cell stacks of the stage one blocks 130. For example, the temperature of the heating fuel 326 may be around 800° C., while the temperature of the heated reformed fuel 324 may be around 700° C., or another temperature.

The heating fuel 326 is then received back into the high temperature fuel heat exchanger 518 to increase the temperature of the heated input fuel 316 as previously described. For example, the high temperature fuel heat exchanger 518 exchanges thermal energy from the heating fuel 326 to the heated input fuel 316. The temperature of the heating fuel 326 is decreased in the high temperature fuel heat exchanger 518 and output as cooled output fuel 328.

In one embodiment of the subject matter described herein, part of the cooled output fuel 328 from the fuel cell stacks of the stage one blocks 130 is split off from the fuel flow cycle 302 as split fuel 332. For example, the conduit carrying the cooled output fuel 328 from the fuel cell stacks of the stage one blocks 130 (e.g., the positive and negative fuel cell stacks 102A1-5 and 104A1-5) may be split into two or more separate conduits, with one or more conduits carrying a first portion of the cooled output fuel 328 (e.g., stage one blocks exhaust fuel) as remaining output fuel 338 to the low temperature fuel heat exchanger 214 and one or more conduits carrying a second portion of the cooled output fuel 328 (e.g., stage one blocks exhaust fuel) as the split fuel 332 into the positive and negative fuel cell stacks of the stage two block 132. For example, the first portion (e.g., the remaining output fuel 338) of the fuel exhaust that is output from the positive and negative fuel cell stacks of the stage one blocks 130 is recirculated and received by the positive and negative fuel cell stacks of the stage one blocks 130. For example, the remaining output fuel 338 (e.g., the first portion) may be directed to the low temperature fuel heat exchanger 214 by a fuel outlet header that passes through the fuel outlet passage 222 of the end wall 142 (of FIG. 2) between the base 116 and the hotbox 118. Additionally, the second portion (e.g., the split fuel 332) of the fuel exhaust that is output from the positive and negative fuel cell stacks of the stage two block 130 is inlet fuel that is received by the positive and negative fuel cell stacks of the stage one block 132, and the stage two exhaust fuel is received by one or more tail gas oxidizers 406 (described in more detail below).

In one embodiment, the portion of the cooled output fuel 328 that is split off or separated from the fuel flow cycle 302 as the split fuel 332 (e.g., the second portion) can be 20%, 25%, 30%, 35%, 40% or the like of the cooled output fuel 328. For example, 35% of the mass of the cooled output fuel 328 may be directed into the air flow cycle 304 as the split fuel 332. Splitting the cooled output fuel 328 into the portions of split fuel 332 and the portion of the remaining output fuel 338 will be discussed in more detail below.

The split fuel 332 is directed into a second air fuel heat exchanger 514 ("AF HX-2" in FIG. 3). In the second air fuel heat exchanger 514, the split fuel 332 is heated. The split fuel 332 receives heat from stack two output air 349 of the air flow cycle 304. The second air fuel heat exchanger 514 transfers heat (e.g., thermal energy) from the hotter stack two output air 349 to the cooler split fuel 332. For example, the second air fuel heat exchanger 514 exchanges heat between the fuel directed into the positive and negative fuel cell stacks of the stage two block 132 (e.g., the split fuel 332) and the air exhaust that is output by the positive and negative fuel cell stacks of the stage two block 132 (e.g., stack two output air 349). The temperature of the split fuel 332 is increased in the second air fuel heat exchanger 514, and is output as heated split fuel 325. For example, the temperature of the split fuel 332 may be increased from a temperature around 500° C. to a temperature around 700° C. Additionally, the temperature of the stack two output air 349 is decreased in the second air fuel heat exchanger 514 and is output as cooled stack two output air 351. For example, the temperature of the stack two output air 349 may be decreased from a temperature around 810° C. to a temperature around 650° C.

The heated split fuel 325 is directed to the positive and negative fuel cell stacks 102, 104 of the stage two block 132. The fuel cells of the stage two block 132 consume at least part of the heated split fuel 325 in the generation of the electric current. For example, the positive fuel cell stack 102B1 of the stage two block 132 generates the positive portion of the electric potential of the system 100, and the negative fuel cell stack 104B1 of the stage two block 132 generates the negative portion of the electric potential of the system 100. The fuel that is not consumed by the fuel cell stacks of the stage two block 132 is output from the stage two block 132 as output stage two fuel 327 (e.g., stage two exhaust fuel). The output stage two fuel 327 may have an increased temperature relative to the heated split fuel 325 that is input into the fuel cell stacks of the stage two block 132. For example, the temperature of the output stage two fuel 327 may be around 800° C., such as 835° C., while the temperature of the heated split fuel 325 may be around 700° C., or another temperature.

In one embodiment, the heated split fuel 325 may be directed to the one or more tail gas oxidizers 406. For example, the system may be a single stage system that includes the positive and negative fuel cell stacks 102, 104 of the stage one blocks 130 but does not include the positive and negative fuel cell stacks 102, 104 of the stage two block 132. The heated split fuel 325 (e.g., the second portion of the stage one fuel exhaust) may be directed from the second air fuel heat exchanger 514 towards the tail gas oxidizer 406. The portion of the cooled output fuel 328 that is split off or separated from the fuel flow cycle 302 as the split fuel 332 (e.g., the second portion that is directed to the tail gas oxidizer 406) can be 10%, 15%, 20%, or the like of the cooled output fuel 328.

The remaining output fuel 338 is input into the low temperature fuel heat exchanger 214. This remaining output fuel 338 exchanges heat with the blown input fuel 336 in the heat exchanger 214. Heat is transferred from the remaining output fuel 338 to the blown input fuel 336 in order to increase the temperature of the blown input fuel 336 as previously described. The temperature of the remaining output fuel 338 is decreased in the low temperature fuel heat exchanger 214 and output as cooled remaining fuel 340. The cooled remaining fuel 340 is then received by the cooler 216 and transfers heat with a coolant that is supplied from a coolant source 342. This coolant source 342 can represent one or more containers of a cooling substance, such as air, water, coolant fluids, or the like, in order to decrease the temperature of the cooled remaining fuel 340 that is output as the cooler output fuel 330. The cooler output fuel 330 is recirculated into the fuel flow cycle 302 by the fuel blower 208.

In one embodiment, all of the cooler output fuel 330 is directed into the low temperature heat exchanger 214 through the fuel blower 208. This cooler output fuel 330 can be mixed with additional source input fuel 310, but no part of the cooler output fuel 330 is split off or directed elsewhere other than back into the low temperature fuel heat exchanger 214.

With respect to the air flow cycle 304 of the system 100, source air 335 is drawn into the system 100 by an air blower 210 partially or fully disposed within the base 116 of FIG. 1, which can represent a fan or other device that moves the air through the air flow cycle 304. In the illustrated embodiment of FIG. 3, a single air blower 210 draws the source air 335 into the air flow cycle 304. Optionally, the system 100 may have two or more air blowers that draw source air 335 into the cycle 304. The source air 335 may be obtained from an oxygen tank or may be ambient air drawn into the system 100 from outside of the system 100 (e.g., outside of the base 116, outside of the system housing 108, or the like). The air 335 output by the air blower 210 can be referred to as input air 337.

The input air 337 is directed into a low temperature air heat exchanger 212 ("AA LT" in FIG. 3). Similar to as described above with the low temperature fuel heat exchanger 214, the low temperature air heat exchanger 212 increases the temperature of the input air 337 and outputs the air as heated input air 339. In one embodiment, the temperature of the input air 337 is or is about 40° C., and the temperature of the heated input air 339 is at least 500° C., such as 520° C. The heated input air 339 is input into a high temperature air heat exchanger 516 ("AA HX" in FIG. 3) and is heated from heat of oxidized effluent 370 (described below). For example, the high temperature air heat exchanger 516 can increase the temperature of the heated input air 339 at least 100C and up to 200C (or another temperature). In one embodiment, the high temperature air heat exchanger 516 increases the temperature of the heated input air 339 from 520° C. to a temperature of about 700° C. The high temperature air heat exchanger 516 heats the heated input air 339 into stack input air 341 that is output by the heat exchanger 516.

The high temperature air heat exchanger 516 is disposed within the system 100 close to or near the fuel cell stacks of the stage one blocks 130 and close by or near the fuel cell stacks of the stage two block 132 in order to absorb heat 323 from the fuel cell stacks of the stage one blocks 130, and absorb heat 322 from the fuel cell stacks of the stage two block 132. The arrangement of the high temperature air heat exchanger 516 disposed close to the fuel cell stacks within the hotbox 118 will be discussed in more detail below.

The stack input air 341 is directed into the positive and negative fuel cell stacks of the stage one blocks 130 and the positive and negative fuel cell stacks of the stage two block 132 for at least partial consumption by the positive and negative fuel cell stacks. At described above, the fuel cell stacks of the stage one blocks 130 and the stage two block 132 consume at least some of the fuel (e.g., the heated reformed fuel 324 and the heated split fuel 325) and the stack input air 341 to generate electric current. In one embodiment, the fuel cell stacks may generate significant amounts of electric current, such as 250 kW of electric energy. In addition to the output fuel (e.g., heating fuel 326 and output stage two fuel 327) that is output from the fuel cell stacks of the stage one blocks 130 and fuel cell stacks of the stage two block 132, the positive and negative fuel cell stacks also direct stack one output air 348 and stack two output air 329 out of the fuel cell stacks and into the first or second air fuel heat exchangers 512, 514. The cooled stack one output air 350 and the cooled stack two output air 351 are directed into one or more tail gas oxidizers 406 along with the output stage two fuel 327. The cooled stack one output air 350 and the cooled stack two output air 351 may be effluent that is output by the fuel cell stacks. As illustrated in FIG. 3, the air that is output by the fuel cell stacks (e.g., output by the stage one blocks 130 and output by the stage two block 132) may be directed into the tail gas oxidizer 406.

The tail gas oxidizer 406 oxidizes the output stage two fuel 327 using at least some of the cooled stack one output air 350 and the cooled stack two output air 351. The oxidized fuel is output from the tail gas oxidizer 406 as the oxidized effluent 370. The oxidized effluent 370 may have an elevated temperature, such as the temperature 800C or another temperature. The oxidized effluent 370 is received into the high temperature air heat exchanger 516, where the effluent 370 heats the heated input air 339 into the stack input air 341, as described above. In one embodiment, passage of the oxidized effluent 370 through the high temperature air heat exchanger 516 reduces the temperature of the effluent 370 by at least 150C. For example, the temperature of the oxidized effluent 370 may be reduced from a temperature of about 800° C. to a temperature of about 600° C., such as 630° C.

In one embodiment, the tail oxidizer oxidizes the output stage two fuel 327 with cooled diluted air 353 that may be directed into the tail gas oxidizer 406 from the air blower 210 with an air control valve 355. The air control valve 355 may be actuated in order to direct the cooled diluted air 353 into the oxidizer 406 in order to control a temperature of the tail gas oxidizer 406 when the system 100 is operating. For example, the cooled diluted air 353 may be directed into the tail gas oxidizer 406 through the oxidizer air passage 226 between the hotbox 118 and the base 116.

In one embodiment, start-up fuel is input into the system 100 from a source 358 of the fuel ("Start Up Source" in FIG. 3). This source 358 can represent one or more containers of a hydrogen-containing substance, such as natural gas. Optionally, the source 358 and the source 308 may be a common source of containers of natural gas within the base 116 of the system 100. Alternatively, the sources 308, 358 may be two different sources of fuel. The fuel provided by the source 358 and input into the system 100 may be referred to as start-up fuel 360. For example, the start-up fuel 360 may be directed into the tail gas oxidizer 406 through the oxidizer fuel passage 224 between the hotbox 118 and the base 116. The start-up fuel 360 may be directed into the tail gas oxidizer 406 when the system 100 begins to operate (e.g., is turned on). Additionally, the source 358 may prevent the input of the start-up fuel 360 after the system 100 has been operating for a designated period of time, after the system 100 has reached a threshold operating temperature, or the like.

The effluent 370 exits the high temperature heat exchanger 516 as cooled effluent 372. The low temperature air heat exchanger 212 receives the cooled effluent 372 and transfers thermal energy from the cooled effluent 372 to the input air 337, as described above. This can reduce the temperature of the cooled effluent 372 in excess of 400C. For example, the temperature of the cooled effluent 372 may be reduced from a temperature of about 600° C. to a temperature no more than 200° C. The cooled effluent 372 exits the low temperature air heat exchanger 212 as output air 373, which exits the air flow cycle 304 (as illustrated in FIG. 3). For example, the output air 373 may be directed through the housing exhaust 218 (of FIG. 2) that directs exhaust from inside the system housing 108 to outside of the system housing 108.

In one embodiment, the effluent 370 may be vented into the hotbox 118 as illustrated in FIG. 3 as vented effluent 375. The vented effluent 375 may be directed from the tail gas oxidizer 406 through one or more conduits within the hotbox 118 that exit the air flow cycle 304. For example, the vented effluent 375 may be directed through the housing exhaust 218 that directs exhaust from inside the system housing 108 to outside of the system housing 108. For example, vented effluent 375 may be vented into the hotbox 118 in order to remove any leaked fuel out of the hotbox 118. Optionally, the vented effluent 375 may be directed out of the air flow cycle 304 and out of the hotbox 118 in order to measure the carbon dioxide CO2 present inside of the hotbox 118. Optionally, the vented effluent 375 may be directed out of the air flow cycle 304 when the system 100 begins to operate (e.g., is turned on), until the system 100 has been operating for a designated period of time, until the system 100 has reached a threshold operating temperature, or the like. Optionally, the vented effluent 375 may be vented into the hotbox 118 for any alternative reasons.

Figure 4:
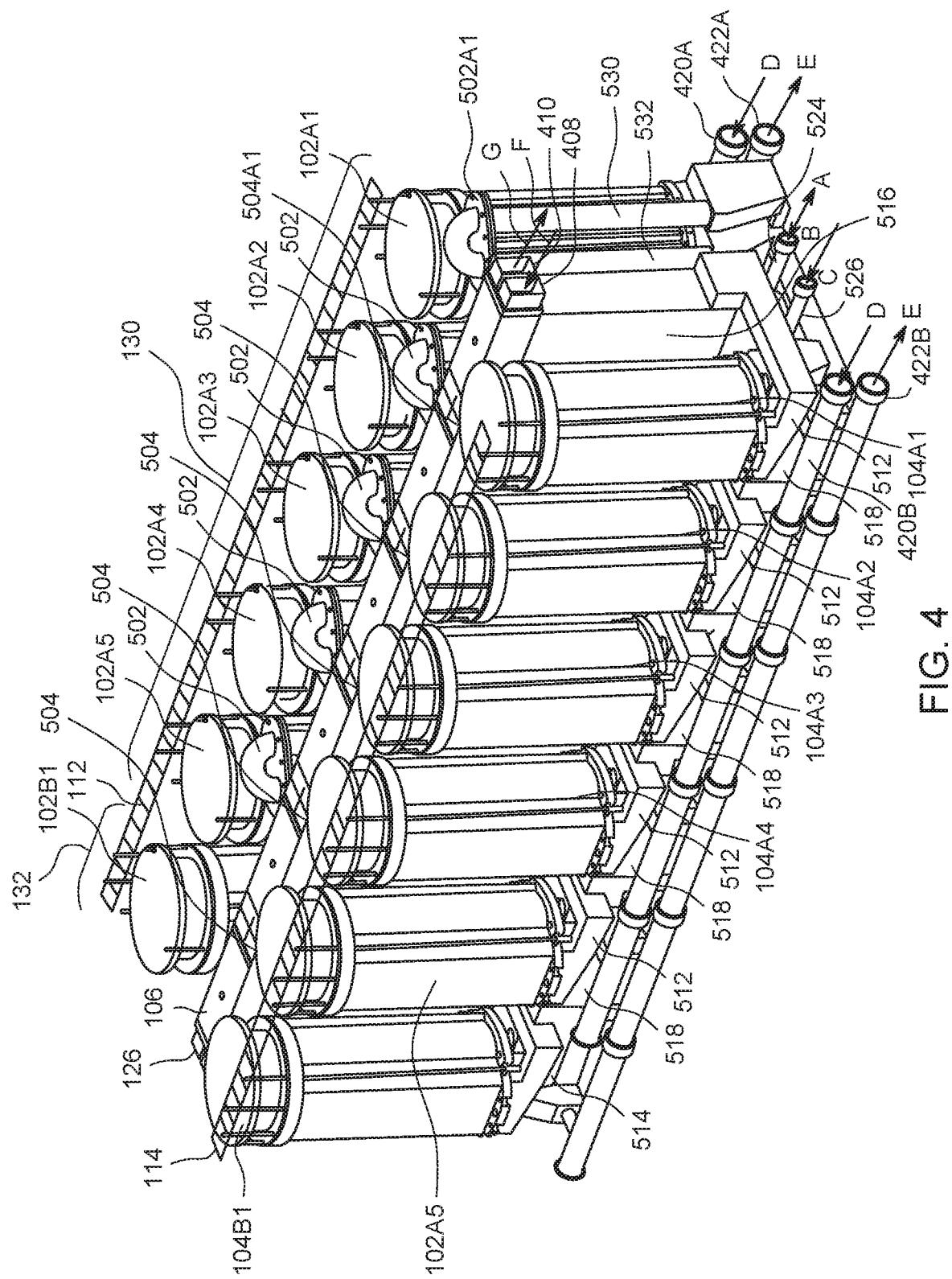
FIG. 4 illustrates a perspective first view of one or more components within a hotbox of the system of FIG. 1 in accordance with one embodiment.
Figure 5:
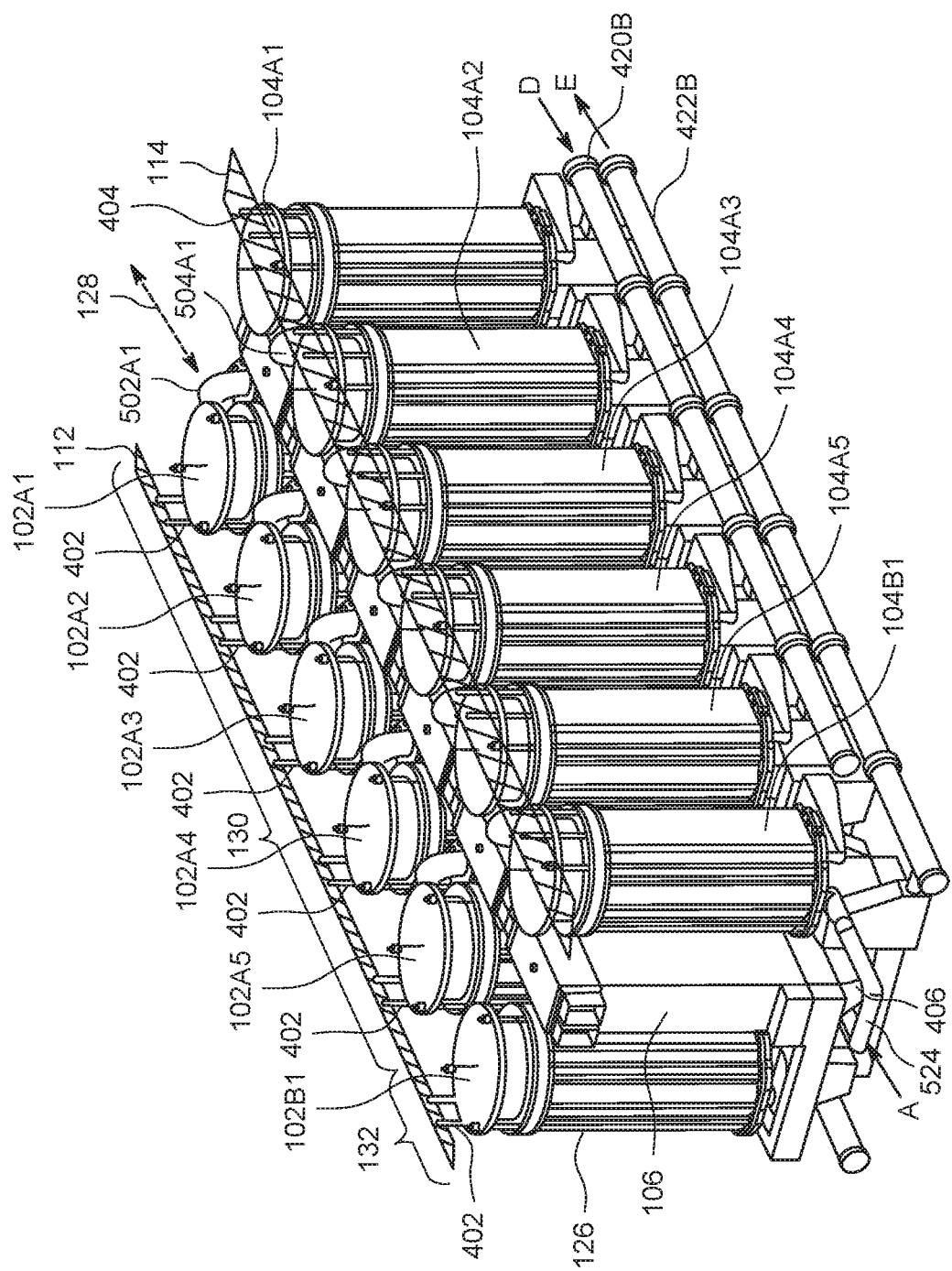
FIG. 5 illustrates a perspective second view of the one or more components within a hotbox of the system of FIG. 1 in accordance with one embodiment.

FIG. 4 illustrates first perspective view of the one or more components within the hotbox 118 of the system 100. FIG. 5 illustrates an opposite second perspective view of the components within the hotbox 118 of the system 100. FIGS. 4 and 5 will be discussed in detail together.

With reference to the fuel flow cycle 302 and the air flow cycle 304 of FIG. 3, FIGS. 4 and 5 illustrate the positive fuel cell stacks 102A1-5 of the stage one blocks 130, the positive fuel cell stack 102B1 of the stage two block 132, the negative fuel cell stacks 104A1-5 of the stage one blocks 130, and the negative fuel cell stack 104B1 of the stage two block 132. Each of the positive fuel cell stacks (102A1, 102A2, 102A3, 102A4, 102A5, and 102B1) have one or more electrical contacts 402 extending from each of the positive fuel cell stacks. The electrical contacts 402 are conductively coupled with the positive electrical bus bar 112 in order to carry the positive portion of the electric potential that is generated by the positive fuel cell stacks to one or more loads within the base 116 of the system 100. Similarly, each of the negative fuel cell stacks (104A1, 104A2, 104A3, 104A4, 104A5, and 104B1) have one or more electrical contacts 404 extending from each of the negative fuel cell stacks. The electrical contacts 404 are conductively coupled with the negative electrical bus bar 114 in order to carry the negative portion of the electric potential that is generated by the negative fuel cell stacks to the one or more loads within the base 116. For example, the positive electrical bus bar 112 and the negative electrical bus bar 114 may be conductively coupled with a common load of the system 100, and may conduct the position and negative portions of the electric potential, respectively, generated by the fuel cell stacks, to the common load. Optionally, the positive and negative electrical bus bars 112, 114 may be conductively coupled with different, or unique loads.

The conduit spine 106 is elongated along the axis 128 between the end wall 142 (of FIGS. 1 and 2) and the second end 126 of the system housing 108. The conduit spine 106 is sized and shaped such that the conduit spine 106 extends between the positive fuel cell stacks 102 and the negative fuel cell stacks 104. The heated input air 339 (of FIG. 3) is directed into the conduit spine 106 from the low temperature air heat exchanger 212 partially or fully contained within the base 116 through a spine inlet 408 in the direction F. The conduit spine 106 directs the heated input air 339 into each of the positive and negative fuel cell stacks 102, 104. For example, the heated input air 339 is directed into the high temperature air heat exchanger 516, and the stack input air 341 is directed into each of the positive and negative fuel cell stacks 102, 104 essentially simultaneously.

The cooled effluent 372 (of FIG. 3) is directed into the conduit spine 106 from the high temperature air heat exchanger 516 contained within the conduit spine 106 through a spine outlet 410 in the direction G. For example, the high temperature air heat exchanger 516 exchanges heat between the air directed into the positive and negative fuel cell stacks 102, 104 (e.g., the stack input air 341) and the exhaust directed out of the positive and negative fuel cell stacks 102, 104 (e.g., the oxidized effluent 370). The conduit spine 106 directs the cooled effluent 372 to the low temperature heat exchanger 212 and out of the air flow cycle 304. For example, the conduit spine 106 directs air exhaust from the positive and negative fuel cell stacks 102, 104 and away from the positive and negative fuel cell stacks 102, 104.

The conduit spine 106 is fluidly coupled with the air blower 210 within the base 116 via the spine inlet 408. For example, one or more conduits may extend from the spine inlet 408 through the end wall 142 between the base 116 and the hotbox 118 in order to direct the input air 337 from the air blower 210 through the low temperature air heat exchanger 212 to the high temperature air heat exchanger 516 within the conduit spine 106 and into the positive and negative fuel cell stacks 102, 104 via the air bower 210.

Additionally, the air blower 210 directs the air exhaust from the positive and negative fuel cell stacks 102, 104 out of the conduit spine 106.

Each of the positive and negative fuel cell stacks 102, 104 of the stage one blocks 130 include reformers 502, 504 that reform the input fuel that is input into the positive and negative fuel cell stacks 102, 104 of the stage one blocks 130. For example, the reformers 502, 504 reform the input fuel that is recirculated into the fuel flow cycle 302 such that the reformers 502, 504 reform the inlet fuel (e.g., natural gas) to hydrogen in order for the positive and negative fuel cell stacks 102, 104 of the stage one blocks 130 to convert the hydrogen into electrical power. The reformer 502 may be referred to herein as a first reformer 502, and the reformer 504 may be referred to herein as a second reformer 504. The designations "first" and "second" are not intended to denote spatial locations of the reformers 502, 504 in the system 100, but instead are used to indicate which reformers 502, 504 are associated with the positive and negative fuel cell stacks 102, 104. Each of the first reformers 502 are fluidly coupled with each of the positive fuel cell stacks 102A1-5 of the stage one blocks 130. Additionally, each of the second reformers are fluidly coupled with each of the negative fuel cell stacks 104A1-5 of the stage one blocks 130. For example, in the illustrated embodiment, the system 100 has five pairs of positive and negative fuel cell stacks 102, 104 (e.g., five positive fuel cell stacks 102, and five negative fuel cell stacks 104), five first reformers 502 (e.g., each fluidly coupled with the five corresponding positive fuel cell stacks) and five second reformers 504 (e.g., each fluidly coupled with the five corresponding negative fuel cell stacks).

The first reformers 502 are located on the first side 148 of the conduit spine 106 with the positive fuel cell stacks 102 of the stage one blocks 130. Additionally, the second reformers 504 are located on the opposite, second side 150 of the conduit spine 106 with the negative fuel cell stacks 102. The first and second reformers 502, 504 are disposed close to or nearest to the positive and negative fuel cell stacks 102, 104 that are fluidly coupled with the corresponding first and second reformers 502, 504 in order to absorb or receive heat (e.g., the heat 322) from the fuel cell stacks of the stage one blocks 130. For example, the first reformer 502A1 is disposed closer to the positive fuel cell stack 102A1 than the first reformer 502A1 is to the positive fuel cell stack 102A2. Similarly, the first reformer 502A1 is disposed closer to the positive fuel cell stack 102A1 than the first reformer 502A1 is to the negative fuel cell stacks 104A1. The first reformer 502A1, fluidly coupled with the positive fuel cell stack 102A1, receives heat from the positive fuel cell stack 102A1. The second reformer 504A1, fluidly coupled with the negative fuel cell stack 104A1, receives heat from the negative fuel cell stacks 104A1

The reformers 502, 504 have a fuel inlet conduit 530 and a fuel outlet conduit 532. For example, the fuel inlet and outlet conduits 530, 532 receive the increased temperature fuel 318 from the high temperature fuel heat exchanger 518 and deliver the reformed fuel 320 to the fuel cell stacks of the stage one blocks 130. As illustrated in FIGS. 4 and 5, the reformers 502, 504 have a generally U-shape conduit structure. For example, the fuel inlet conduit 530 moves the fuel from the high temperature fuel heat exchanger 518 disposed near the bottom side 136 of the system housing (of FIG. 1) up within the fuel inlet conduit 530 to a conduit U-bend, and the fuel outlet conduit 532 moves the fuel down within the fuel outlet conduit 532 from the conduit U-bend to the first air fuel heat exchanger 512 disposed near the bottom side 136 of the system housing 108 (of FIG. 1). Additionally or alternatively, the reformers 502, 504 may have any alternative conduit structure between the high temperature fuel heat exchanger 518 and the first air fuel heat exchanger 512. Optionally, one or more of the reformers 502, 504 may have a uniform conduit structure as one or more other reformers 502, 504, may have a unique shape as one or more other reformers 502, 504, or any combination therein.

In one embodiment, the inlet fuel is reformed within the fuel inlet conduit 530 and within the fuel outlet conduit 532. Optionally, the inlet fuel may be reformed only within the fuel outlet conduit 532. Optionally, the inlet fuel may be reformed within a portion of the fuel inlet conduit 530, within a portion of the fuel outlet conduit 532, or any alternative combinations thereof.

In the illustrated embodiment, each of the first air fuel heat exchangers 512 and each of the high temperature fuel heat exchangers 518 fluidly coupled with the corresponding positive and negative fuel cell stacks 102, 104 of the stage one blocks 130 are disposed near the bottom side 136 of the system housing 108. Additionally or alternatively, one or more of the first air fuel heat exchangers 512 or the high temperature fuel heat exchangers 518 may be disposed at another location inside the hotbox 118. For example, the reformers 502, 504 may have an alternative conduit structure based on the location of the first air fuel heat exchangers 512 and/or the high temperature fuel heat exchangers 518.

In the illustrated embodiment, each of the second air fuel heat exchangers 514 fluidly coupled with the corresponding positive and negative fuel cell stacks 102, 104 of the stage two block 132 are disposed near the bottom side 136 of the system house 108. For example, the second air fuel heat exchangers 514 may be located near the first air fuel heat exchangers 512 and/or the high temperature fuel heat exchangers 518. Additionally or alternatively, the second air fuel heat exchangers 514 may be disposed at another location inside the hotbox 118.

The system 100 includes fuel inlet headers 420 and fuel outlet headers 422. The fuel inlet headers 420 are conduits that receive the heated inlet fuel 316 that is output by the low temperature fuel heat exchanger 214 located inside of the base 116 and directs the fuel to the positive and negative fuel cell stacks 102, 104 of the stage one blocks 130. For example, the fuel inlet headers 420 may extend through the fuel inlet passages 220 of the end wall 142 (of FIG. 2) in order to transfer fuel from a location outside of the hotbox 118 to a location inside of the hotbox 118 in the direction D. In the illustrated embodiment, a first fuel inlet header 420A directs the fuel to the positive fuel cell stacks 102A1-5 of the stage one blocks 130, and a second fuel inlet header 420B directs the fuel to the negative fuel cell stacks 104A1-5.

The first fuel inlet header 420A is disposed near an outside of the positive fuel cell stacks 102A1-5 and the conduit spine 106 is disposed near an opposite, inside of the positive fuel cell stacks 102A1-5. For example, the first fuel inlet header 420A is disposed proximate to the first side 138 of the system housing 108 relative to the conduit spine 106. The second fuel inlet header 420B is disposed near an outside of the negative fuel cell stacks 104A1-5 and the conduit spine 106 is disposed near an opposite, inside of the negative fuel cell stacks 104A1-5. For example, the second fuel inlet header 420B is disposed proximate to the second side 140 of the system housing 108 relative to the conduit spine 106. Additionally or alternatively, the system 100 may use less than two or more than two fuel inlet headers to direct the fuel to the positive and negative fuel cell stacks of the stage one blocks 130. Additionally or alternatively, the first and second fuel inlet headers 420A, 420B may be disposed at another location within the hotbox 118.

The fuel outlet headers 422 are conduits that receive the remaining output fuel 338 (e.g., the first portion of the stage one blocks fuel exhaust) from the first portion of the positive and negative fuel cell stacks 102, 104 of the stage one blocks 130 and directs the remaining output fuel 338 to the low temperature fuel heat exchanger 214 located inside of the base 116. For example, the fuel outlet headers 422 may extend through the fuel outlet passages 222 of the end wall 142 (of FIG. 2) in order to transfer exhaust fuel from a location inside of the hotbox 118 to a location outside of the hotbox 118 in the direction E. In the illustrated embodiment, a first fuel outlet header 422A directs the fuel exhaust away from the positive fuel cell stacks 102A1-5 of the stage one blocks 130, and a second fuel outlet header 422B directs the away fuel from the negative fuel cell stacks 104A1-5.

The first fuel outlet header 422A is disposed near an outside of the positive fuel cell stacks 102A1-5 and the conduit spine 106 is disposed near an opposite, inside of the positive fuel cell stacks 102A1-5. For example, the first fuel outlet header 422A is disposed proximate to the first side 138 of the system housing 108 relative to the conduit spine 106. The second fuel outlet header 422B is disposed near an outside of the negative fuel cell stacks 104A1-5 and the conduit spine 106 is disposed near an opposite, inside of the negative fuel cell stacks 104A1-5. For example, the second fuel outlet header 422B is disposed proximate to the second side 140 of the system housing 108 relative to the conduit spine 106. Additionally or alternatively, the system 100 may use less than two or more than two fuel outlet headers to direct the remaining output fuel 338 from the positive and negative fuel cell stacks of the stage one blocks 130. Additionally or alternatively, the first and second fuel outlet headers 422A, 422B may be disposed at another location within the hotbox 118.

The one or more tail gas oxidizers 406 are disposed near the bottom side 136 of the system housing 108 and along a bottom side of the conduit spine 106 between the end wall 142 and the second end 126 of the system housing 108. Additionally or alternatively, the one or more tail gas oxidizers 406 may be disposed in any alternative location within the hotbox 118.

The system 100 includes an oxidizer fuel manifold 524 and an oxidizer air manifold 526. The oxidizer fuel manifold 524 is a conduit that receives the start-up fuel 360 from the start-up source 358 located outside of the hotbox 118 and directs the start-up fuel 360 to the tail gas oxidizers 406 in the direction B. Additionally, the oxidizer fuel manifold 524 directs the output stage two fuel 327 away from the positive and negative fuel cell stacks 102B1, 104B1 of the stage two stack 132 and to a location outside of the hotbox 118 in the direction A. For example, fuel and/or fuel exhaust may transfer within the oxidizer fuel manifold 524 in two directions. The oxidizer fuel manifold 524 is disposed near the bottom side 136 of the system housing 108 and extends along a bottom side of the conduit spine 106 between the end wall 142 and the second end 126 of the system housing 108. For example, the oxidizer fuel manifold 524 may extend through the oxidizer fuel passage 224 of the end wall 142 (of FIG. 2) in order to transfer fuel to and/or from a location outside of the hotbox 118 to a location inside and/or outside of the hotbox 118. Additionally or alternatively, the system 100 may have a first oxidizer fuel manifold that directs start-up fuel 360 into the system 100, and a different, second oxidizer fuel manifold that directs the fuel exhaust away from the positive and negative fuel cell stacks of the stage two block 132. Additionally or alternatively, the one or more oxidizer fuel manifolds may be disposed in any alternative location within the hotbox 118.

The oxidizer air manifold 526 is a conduit that receives the cooled diluted air 353 from the source air 335 when the air control valve 355 is actuated. For example, the control valve 355 may be actuated in order to direct the cooled diluted air 353 from the air blower 210 and into the hotbox 118 in order to control a temperature of the tail gas oxidizer 406 when the system 100 is operation. The oxidizer air manifold 526 directs the cooled diluted air 353 directs to the tail gas oxidizers 406 in the direction C. The oxidizer air manifold 526 is disposed near the bottom side 136 of the system housing 108. For example, the oxidizer air manifold 526 may extend through the oxidizer air passage 226 of the end wall 142 (of FIG. 2) in order to transfer the cooled diluted air 353 from a location outside of the hotbox 118 to a location inside of the hotbox 118. Additionally or alternatively, the oxidizer air manifold 526 may be disposed in any alternative location within the hotbox 118.

FIGS. 6 through 9 illustrate four examples of the configuration of the stage one blocks, the stage two block, and the associated conduits, valves, or the like, in order to split the cooled output fuel 328 that is output from the first portion of the positive and negative fuel cell stacks of the stage one blocks 130 into the first portion of fuel exhaust (e.g., the recirculated remaining output fuel 338) and the second portion of fuel exhaust (e.g., the split fuel 332) that is received by the second portion of the positive and negative fuel cell stacks of the stage two block 132. Optionally, one or more of the stage one blocks, the stage two block, the conduits, control valves, or a combination of one or more of therein may have an alternative configuration.

Figure 6:
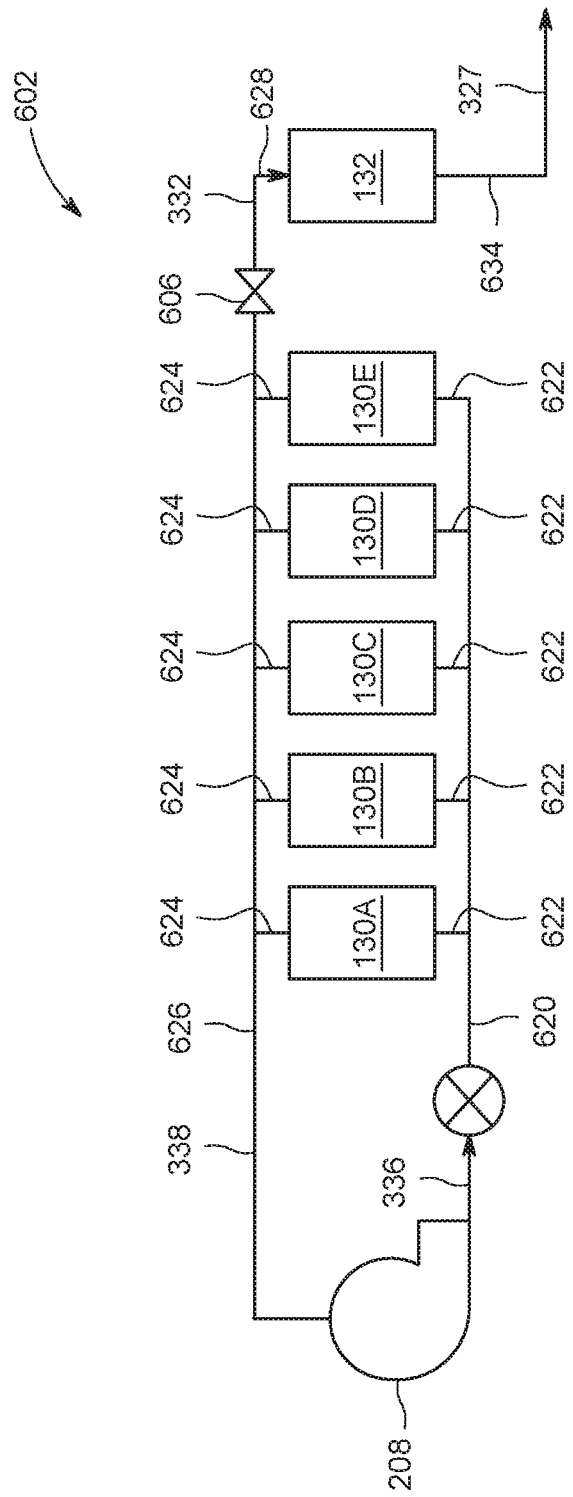
FIG. 6 illustrates a schematic representation of a recirculated fuel flow cycle in accordance with one embodiment.

FIG. 6 illustrates a schematic representation of a recirculated fuel flow cycle 602 in accordance with one embodiment. The blown input fuel 336 is directed from the fuel blower 208 (of FIG. 3) in a direction away from the fuel blower 208 in a first conduit 620. The blown input fuel 336 is directed into five stage one blocks 130A-E (e.g., the positive and negative fuel cell stacks 102A1-5, 104A1-5) via input conduits 622 and directed out of the five stage one blocks 130A-E via output conduits 624. A control valve 606 controls the amount of fuel of the first portion of output fuel (e.g., the remaining output fuel 338) that is directed back towards the fuel blower 208 via a recirculated conduit 626 and the amount of fuel of the second portion of the output fuel (e.g., the split fuel 332) that is directed towards the stage two block 132 (e.g., the positive and negative fuel cell stacks 102B1, 104B1) via a stage two input conduit 628. For example, the control valve 606 is fluidly coupled with the positive and negative fuel cell stacks of the stage one blocks 130. The control valve 606 controls the amount of the first portion of the fuel exhaust that is recirculated and received by the positive and negative fuel cell stacks of the stage one blocks 130, and controls the amount of the second portion of the fuel exhaust that is received by the one or more tail gas oxidizers 406.

In one embodiment, the first portion (e.g., the remaining output fuel 338) is 65% of the mass of the fuel, and the second portion (e.g., the split fuel 332) is 35% of the mass of the fuel that is directed out of the five stage one blocks 130A-E. Optionally, the first portion may be 70%, 65%, 60%, or the like, of the mass of the fuel, and the second portion may be 30%, 35%, 40%, or the like, of the fuel. The output stage two fuel 327 is directed out of the stage two block 132 (e.g., directed to the tail gas oxidizer 406) via an oxidizer conduit 634. Additionally or alternatively, the stage two block 132 may be moved to a location between two of the stage one blocks (e.g., between blocks 130B and 130C), and the corresponding conduits or pipes may be moved to an alternative location in order to direct 35% of the mass of the fuel to the stage two block 132 and to direct 65% of the mass of the fuel to the fuel blower 208.

Figure 7:
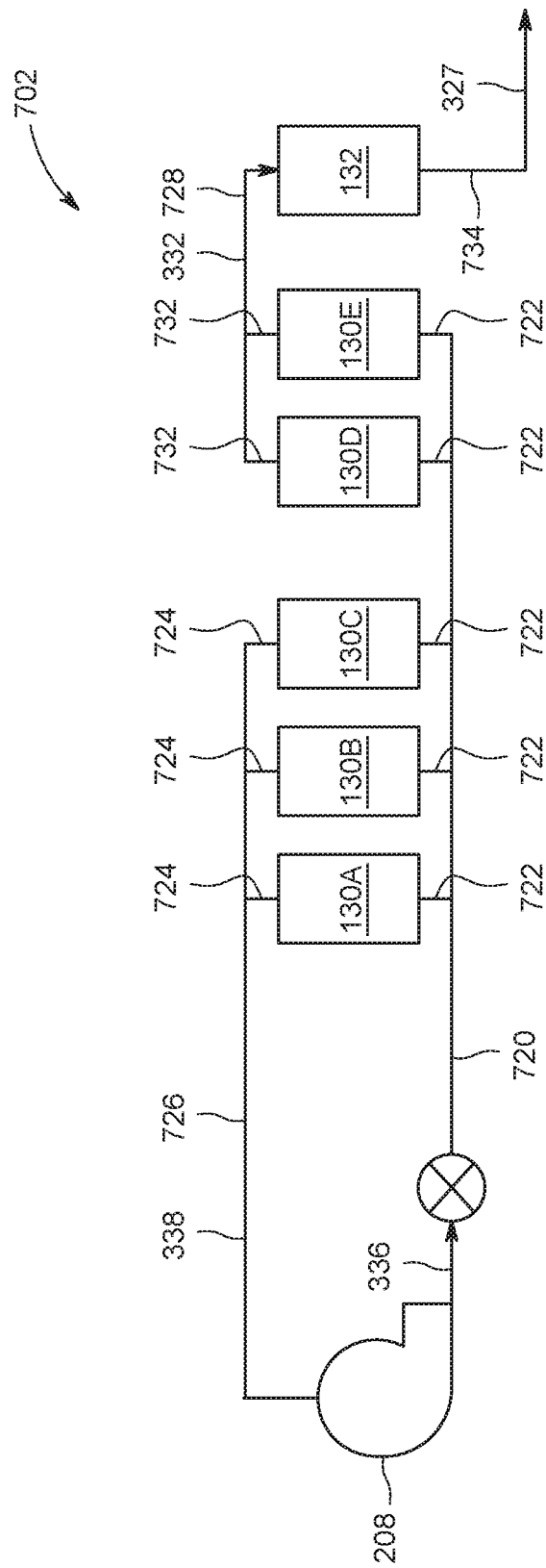
FIG. 7 illustrates a schematic representation of a recirculated fuel flow cycle in accordance with one embodiment.

FIG. 7 illustrates a schematic representation of a recirculated fuel flow cycle 702 in accordance with one embodiment. The blown input fuel 336 is directed from the fuel blower 208 in a direction away from the fuel blower 208 in a first conduit 720. The input fuel 336 is directed into the five stage one blocks 130A-E (e.g., the positive and negative fuel cell stacks 102A1-5, 104A1-5) via input conduits 722 and directed out of three stage one blocks 130A, 130B, 130C (e.g., the positive and negative fuel cell stacks 102A1-3, 104A1-3) via output conduits 724. The first portion of the output fuel (e.g., the remaining output fuel 338) is directed back towards the blower 208 via a recirculated conduit 726. The second portion of the output fuel (e.g., the split fuel 332) is directed out of the two stage one blocks 130D, 130E via second portion output conduits 732 and directed towards the stage two block 132 (e.g., the positive and negative fuel cell stacks 102B1-5, 104B) via a stage two input conduit 728. The output stage two fuel 327 is directed out of the stage two block 132 (e.g., directed to the tail gas oxidizer 406) via an oxidizer conduit 734.

Figure 8:
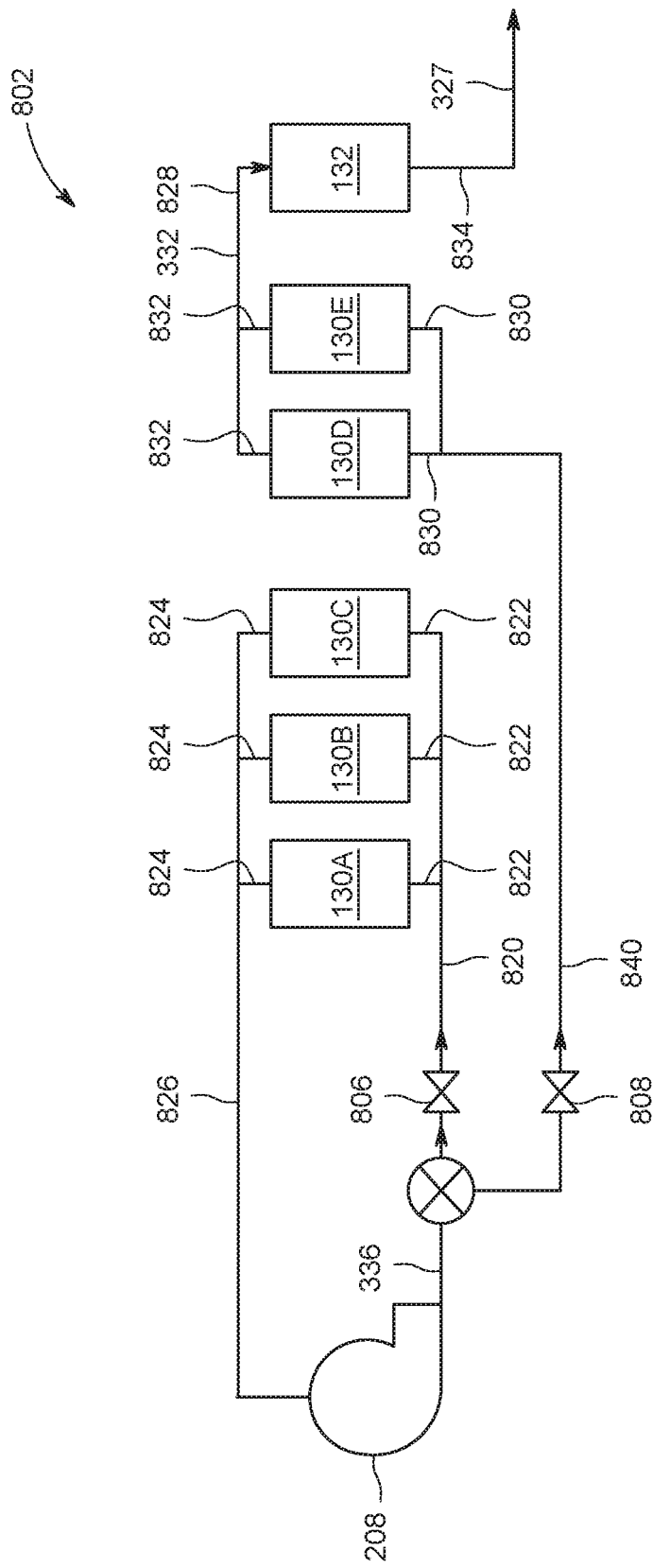
FIG. 8 illustrates a schematic representation of a recirculated fuel flow cycle in accordance with one embodiment.

FIG. 8 illustrates a schematic representation of a recirculated fuel flow cycle 802 in accordance with one embodiment. The blown input fuel 336 is directed from the fuel blower 208 in a direction away from the fuel blower 208. A first control valve 806 controls the amount of a first portion of the blown input fuel 336 that is directed to three stage one blocks 130A, 130B, 130C via a first input conduit 820. The first portion of the blown input fuel 336 is directed into the three stage one blocks 130A-C (e.g., the positive and negative fuel cell stacks 102A1-3, 104A1-3) via first portion input conduits 822 and directed out of the three stage one blocks 130A-C via first portion output conduits 824. For example, the first portion of the blown input fuel 336 is directed back towards the blower 208 via a recirculated conduit 826.

A second control valve 808 controls the amount of a second portion of the blown input fuel 336 that is directed to two stage one blocks 130D, 130E (e.g., the positive and negative fuel cell stacks 102A4-5, 104A4-5) via a second input conduit 840. The second portion of the blown input fuel 336 is directed into the two stage one blocks 130D, 130E via second portion input conduits 830. The second portion of the blown 336 is directed out of the two stage one blocks 130D, 130E via second portion output conduits 832 and directed towards the stage two block 132 (e.g., the positive and negative fuel cell stacks 102B1, 104B1) via a stage two input conduit 828. The output stage two fuel 327 is directed out of the stage two block 132 (e.g., directed to the tail gas oxidizer 406) via an oxidizer conduit 834.

In one embodiment, the first portion of the fuel exhaust of the fuel flow cycle 802 is 65% of the mass of the fuel, and the second portion of the fuel exhaust is 35% of the mass of the fuel. Optionally, the first portion may be 70%, 65%, 60%, or the like, of the mass of the fuel, and the second portion may be 30%, 35%, 40%, or the like, of the mass of the fuel.

Figure 9:
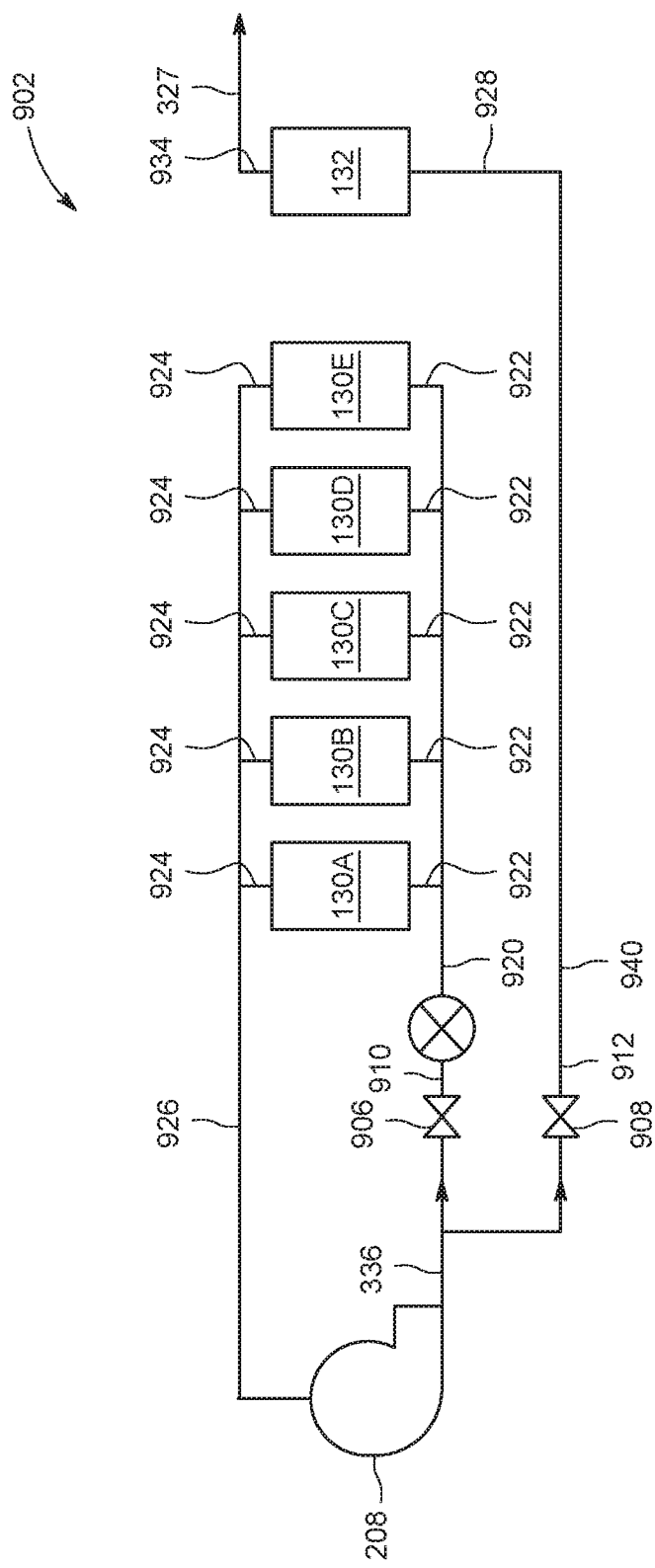
FIG. 9 illustrates a schematic representation of a recirculated fuel flow cycle in accordance with one embodiment.

FIG. 9 illustrates a schematic representation of a recirculated fuel flow cycle 902 in accordance with one embodiment. The blown input fuel 336 is directed from the fuel blower 208 in a direction away from the fuel blower 208. A first control valve 906 controls the amount of a first portion of blown input fuel 910 that is directed to five stage one blocks 130A-E via a first input conduit 920. The first portion of the blown input fuel 336 is directed into the five stage one blocks 130A-E via first portion input conduits 922 and directed out of the five stage one blocks 130A-E via first portion output conduits 924. For example, the first portion of the blown input fuel 336 that is directed by the first control valve 906 is directed back towards the blower 208 via a recirculated conduit 926.

Figure 10:
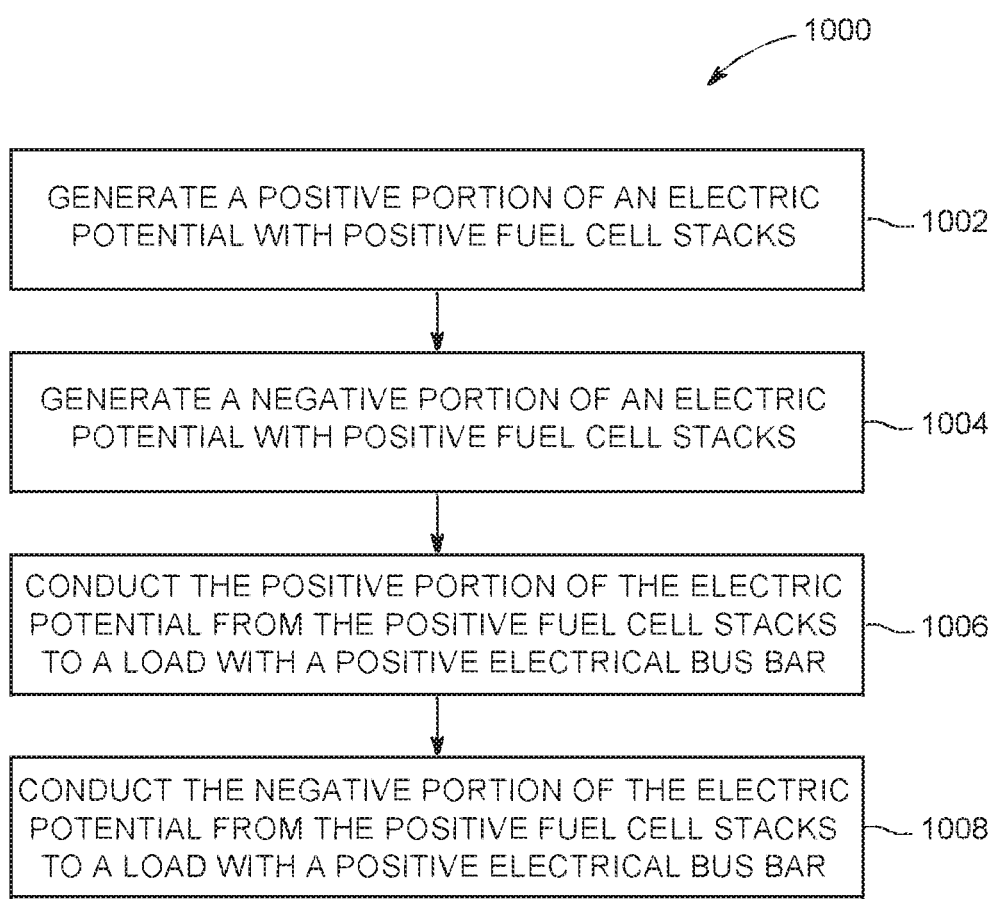
FIG. 10 illustrates a flowchart method in accordance with one embodiment.

A second control valve 908 controls the amount of a second portion of the blown input fuel 912 that is directed to the stage two block 132 (e.g., the positive and negative fuel cell stacks 102B1, 104B1) via a second portion input conduit 940. The second portion of the blown input fuel 912 is directed into the stage two block 132 via stage two input conduit 928. The output stage two fuel 327 is directed out of the stage two block 132 (e.g., directed to the tail gas oxidizer 406) via an oxidizer conduit 934. FIG. 10 illustrates a flowchart of a method 1000 in accordance with one embodiment. At 1002, positive fuel cell stacks (e.g., 102A1-5, 102B1) generate a positive portion of an electric potential of a fuel cell system. For example, the system includes positive fuel cell stacks that convert hydrogen (e.g., fuel) that is input into the system and oxygen into water to produce electricity. The positive fuel cell stacks are arranged in order to generate the positive portion of the potential of the system.

At 1004, negative fuel cell stacks (e.g., 104A1-5, 104B1) generate a negative portion of an electric potential of the fuel cell system. For example, the system includes negative fuel cell stacks that convert hydrogen (e.g., fuel) that is input into the system and oxygen into water to produce electricity. The negative fuel cell stacks are arranged in order to generate the negative portion of the potential of the system.

At 1006, the positive portion of the electric potential is conducted from the positive fuel cell stacks (102A1-5, 102B1) and to one or more loads with a positive electrical bus bar. For example, the positive fuel cell stacks may be conductively coupled with the positive electrical bus bar in order to conduct the positive portion of the electric potential from the positive fuel cell stacks to a common load, to multiple loads, or the like, of the system.

At 1008, the negative portion of the electric potential is conducted from the negative fuel cell stacks (104A1-5, 104B1) and to the one or more loads with a negative electrical bus bar. For example, the negative fuel cell stacks may be conductively coupled with the negative electrical bus bar in order to conduct the negative portion of the electric potential from the negative fuel cell stacks to the common load, to multiple loads, or the like, of the system.

In one embodiment of the subject matter described herein, a system includes one or more positive fuel cell stacks configured to generate a positive portion of an electric potential and one or more negative fuel cell stacks configured to generate a negative portion of the electric potential. The system includes a positive electrical bus bar conductively coupled with the one or more positive fuel cell stacks and configured to conduct the positive portion of the electric potential from the one or more positive fuel cell stacks to one or more loads. The system includes a negative electrical bus bar conductively coupled with the one or more negative fuel cell stacks and configured to conduct the negative portion of the electric potential from the one or more negative fuel cell stacks to the one or more loads. The positive electrical bus bar is elongated and extends between the one or more positive fuel cell stacks and the negative electrical bus bar is elongated and extends between the one or more negative fuel cell stacks.

Optionally, the positive electrical bus bar and the negative electric bus bar are configured to be conductively coupled with a common load of the one or more loads and are configured to conduct the positive portion and the negative portion of the electric potential to the common load.

Optionally, the system includes a conduit spine that is elongated and extends between the one or more positive fuel cell stacks and the one or more negative fuel cell stacks. The conduit spine is configured to direct air into the one or more positive fuel cell stacks and into the one or more negative fuel cell stacks. The conduit spine is also configured to direct exhaust from the one or more positive fuel cell stacks and from the one or more negative fuel cell stacks away from the one or more positive fuel cell stacks and away from the one or more negative fuel cell stacks.

Optionally, the system includes one or more high temperature air heat exchangers configured to exchange heat between the air directed into the one or more positive fuel cell stacks and into the one or more negative fuel cell stacks and the exhaust directed out of the one or more positive fuel cell stacks and out of the one or more negative fuel cell stacks.

Optionally, the conduit spine is configured to be fluidly coupled with one or more air blowers in order to direct the air into the one or more positive fuel cell stacks and into the one or more negative fuel cell stacks and direct the exhaust from the one or more positive fuel cell stacks and exhaust from the one or more negative fuel cell stacks away from the one or more positive fuel cell stacks and away from the one or more negative fuel cell stacks via the one or more air blowers.

Optionally, the system includes one or more first reformers configured to reform input fuel that is input into the one or more positive fuel cell stacks, and one or more second reformers configured to reform input fuel that is input into the one or more negative fuel cell stacks. The system also includes a conduit spine that is elongated and extends between the one or more positive fuel cell stacks and the one or more negative fuel cell stacks. The one or more first reformers are located on a first side of the conduit spine with the one or more positive fuel cell stacks, and the one or more second reformers are located on a second side of the conduit spine with the one or more negative fuel cell stacks.

Optionally, the one or more first reformers are configured to receive heat from the one or more positive fuel cell stacks, and the one or more second reformers are configured to receive heat from the one or more negative fuel cell stacks.

Optionally, the system includes one or more high temperature fuel heat exchangers configured to exchange heat between fuel directed into the one or more positive fuel cell stacks and fuel directed into the one or more negative fuel cell stacks and fuel exhaust that is output by the one or more positive fuel cell stacks and fuel exhaust that is output by the one or more negative fuel cell stacks.

Optionally, the one or more positive fuel cell stacks and the one or more negative fuel cell stacks are disposed inside of a hotbox and are configured to receive input fuel from a location outside of the hotbox.

Optionally, the system includes one or more stage one blocks comprising a first portion of the one or more positive fuel cell stacks and a first portion of the one or more negative fuel cell stacks and a stage two block comprising a second portion of the one or more positive fuel cell stacks and a second portion of the one or more negative fuel cell stacks. The stage one blocks are configured to receive a first portion of fuel exhaust that is output from the first portion of the one or more positive fuel cell stacks and output from the first portion of the one or more negative fuel cell stacks of the stage one blocks. The stage two block is configured to receive a second portion of fuel exhaust that is output from the first portion of the one or more positive fuel cell stacks and output from the first portion of the one or more negative fuel cell stacks of the one or more stage one blocks.

Optionally, the one or more positive fuel cell stacks and the one or more negative fuel cell stacks are configured to be fluidly coupled with a fuel blower in order to direct the first portion of the fuel exhaust the is output from the first portion of the one or more positive fuel cell stacks and output from the first portion of the one or more negative fuel cell stacks of the one or more stage one blocks back into the one or more positive fuel cell stacks and into the one or more negative fuel cell stacks via the fuel blower.

Optionally, the system includes one or more control valves fluidly coupled with the one or more positive fuel cell stacks and the one or more negative fuel cell stacks. The one or more control valves are configured to control an amount of the first portion of the fuel exhaust that is received by the one or more stage one blocks and an amount of the second portion of the fuel exhaust that is received by the stage two block.

Optionally, the system includes one or more air fuel heat exchangers configured to exchange heat between fuel directed into the one or more positive fuel cell stacks and into the one or more negative fuel cell stacks and air exhaust that is output by the one or more positive fuel cell stacks and air exhaust that is output by the one or more negative fuel cell stacks.

Optionally, the system includes one or more tail gas oxidizers disposed inside of a hotbox and fluidly coupled with the one or more positive fuel cell stacks and the one or more negative fuel cell stacks, wherein the one or more tail gas oxidizers are configured to vent effluent that is output from the one or more tail gas oxidizers into the hotbox.

In one embodiment of the subject matter described herein, a method includes generating a positive portion of an electric potential with one or more positive fuel cell stacks and generating a negative portion of the electric potential with one or more negative fuel cell stacks. The method includes conducting the positive portion of the electric potential from the one or more positive fuel cell stacks to one or more loads with a positive electrical bus bar conductively coupled with the one or more positive fuel cell stacks, wherein the positive electrical bus bar is elongated and extends between the one or more positive fuel cell stacks. The method includes conducting the negative portion of the electric potential from the one or more negative fuel cell stacks to the one or more loads with a negative electrical bus bar conductively coupled with the one or more negative fuel cell stacks, wherein the negative electrical bus bar is elongated and extends between the one or more negative fuel cell stacks.

Optionally, the positive electrical bus bar and the negative electrical bus bar are configured to be conductively coupled with a common load of the one or more loads and are configured to conduct the positive portion and the negative portion of the electric potential to the common load.

Optionally, the method includes directing air into the one or more positive fuel cell stacks and into the one or more negative fuel cell stacks with a conduit spine that is elongated and extends between the one or more positive fuel cell stacks and the one or more negative fuel cell stacks. The method includes directing exhaust from the one or more positive fuel cell stacks and from the one or more negative fuel cell stacks away from the one or more positive fuel cell stacks and away from the one or more negative fuel cell stacks with the conduit spine.

Optionally, the method includes exchanging heat between the air directed into the one or more positive fuel cell stacks and into the one or more negative fuel cell stacks and the exhaust from the one or more positive fuel cell stacks and the exhaust from the one or more negative fuel cell stacks with one or more high temperature air heat exchangers.

Optionally, the method includes directing the air into the one or more positive fuel cell stacks and into the one or more negative fuel cell stacks and directing the exhaust from the one or more positive fuel cell stacks and the exhaust from the one or more negative fuel cell stacks away from the one or more positive fuel cell stacks and away from the one or more negative fuel cell stacks via one or more air blowers configured to be fluidly coupled with the conduit spine.

Optionally, the method includes reforming input fuel that is input into the one or more positive fuel cell stacks with one or more first reformers, and reforming input fuel that is input into the one or more negative fuel cell stacks with one or more second reformers. The one or more first reformers are located on a first side of a conduit spine that is elongated and extends between the one or more positive fuel cell stacks and the one or more negative fuel cell stacks with the one or more positive fuel cell stacks, and the one or more second reformers are located on a second side of the conduit spine with the one or more negative fuel cell stacks.

Optionally, the one or more first reformers are configured to receive heat from the one or more positive fuel cell stacks, and the one or more second reformers are configured to receive heat from the one or more negative fuel cell stacks.

Optionally, the method includes exchanging heat between fuel directed into the one or more positive fuel cell stacks and into the one or more negative fuel cell stacks and fuel exhaust that is output by the one or more positive fuel cell stacks and fuel exhaust that is output by the one or more negative fuel cell stacks with one or more high temperature fuel heat exchangers.

Optionally, the one or more positive fuel cells tacks and the one or more negative fuel cell stacks are disposed inside of a hotbox and are configured to receive input fuel from a location outside of the hotbox.

Optionally, one or more stage one blocks comprising a first portion of the one or more positive fuel cell stacks and a first portion of the one or more negative fuel cell stacks are configured to receive a first portion of fuel exhaust that is output from the first portion of the one or more positive fuel cell stacks and output from the first portion of the one or more negative fuel cell stacks, and wherein a stage two block comprising a second portion of the one or more positive fuel cell stacks and a second portion of the one or more negative fuel cell stacks is configured to receive a second portion of fuel exhaust that is output from the first portion of the one or more positive fuel cell stacks and output from the first portion of the one or more negative fuel cell stacks.

Optionally, the one or more positive fuel cell stacks and the one or more negative fuel cell stacks are configured to be fluidly coupled with a fuel blower in order to direct the first portion of the fuel exhaust that is output from the first portion of the one or more positive fuel cell stacks and output from the first portion of the one or more negative fuel cell stacks of the one or more stage one blocks back into the one or more positive fuel cell stacks and into the one or more negative fuel cell stacks via the fuel blower.

Optionally, one or more control valves fluidly coupled with the one or more positive fuel cell stacks and the one or more negative fuel cell stacks are configured to control an amount of the first portion of the fuel exhaust that is received by the one or more stage one blocks and an amount of the second portion of the fuel exhaust that is received by the stage two block.

Optionally, one or more air fuel heat exchangers are configured to exchange heat between fuel directed into the one or more positive fuel cell stacks and into the one or more negative fuel cell stacks and air exhaust that is output by the one or more positive fuel cell stacks and air exhaust that is output by the one or more negative fuel cell stacks.

In one embodiment of the subject matter described herein, a system includes one or more positive fuel cell stacks configured to generate a positive portion of an electric potential and one or more negative fuel cell stacks configured to generate a negative portion of the electric potential. The system includes a positive electrical bus bar conductively coupled with the positive fuel cell stacks and configured to conduct the positive portion of the electric potential from the one or more positive fuel cell stacks to one or more loads. The system includes a negative electrical bus bar conductively coupled with the one or more negative fuel cell stacks and configured to conduct the negative portion of the electric potential from the one or more negative fuel cell stacks to the one or more loads. The positive electrical bus bar is elongated and extends between the one or more positive fuel cell stacks and the negative electrical bus bar is elongated and extends between the one or more negative fuel cell stacks. The positive electrical bus bar and the negative electrical bus bar are configured to be conductively coupled with a common load of the one or more loads and are configured to conduct the positive portion and the negative portion of the electric potential to the common load.

Optionally, the system includes a conduit spine that is elongated and extends between the one or more positive fuel cell stacks and the one or more negative fuel cell stacks. The conduit spine is configured to direct air into the one or more positive fuel cell stacks and into the one or more negative fuel cell stacks. The conduit spine is also configured to direct exhaust from the one or more positive fuel cell stacks and from the one or more negative fuel cell stacks away from the one or more positive fuel cell stacks and away from the one or more negative fuel cell stacks.

Optionally, the system includes one or more high temperature air heat exchangers configured to exchange heat between the air directed into the one or more positive fuel cell stacks and into the one or more negative fuel cell stacks and the exhaust directed out of the one or more positive fuel cell stacks and the exhaust directed out of the one or more negative fuel cell stacks.

Optionally, the system includes one or more first reformers configured to reform input fuel that is input into the one or more positive fuel cell stacks, one or more second reformers configured to reform input fuel that is input into the one or more negative fuel cell stacks, and a conduit spine that is elongated and extends between the one or more positive fuel cell stacks and the one or more negative fuel cell stacks. The one or more first reformers are located on a first side of the conduit spine with the one or more positive fuel cell stacks and the one or more second reformers are located on a second side of the conduit spine with the one or more negative fuel cell stacks.

Optionally, the one or more first reformers are configured to receive heat from the one or more positive fuel cell stacks, and the one or more second reformers are configured to receive heat from the one or more negative fuel cell stacks.

As used herein, an element or step recited in the singular and proceeded with the word "a" or "an" should be understood as not excluding plural of said elements or steps, unless such exclusion is explicitly stated. Furthermore, references to "one embodiment" of the presently described subject matter are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are exemplary embodiments. Many other embodiments will be apparent to those of skill in the art upon reviewing the above description. The scope of the subject matter described herein should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the subject matter set forth herein, including the best mode, and also to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A system comprising:
    positive contacts of each of a first plurality of fuel cell stacks configured to generate a first portion of an electric potential, the first plurality of fuel cell stacks being arranged in a first linear array;
    negative contacts of each of a second plurality of fuel cell stacks configured to generate a second portion of the electric potential, the second plurality of fuel cell stacks being arranged in a second linear array;
    a positive electrical bus bar conductively coupled with the positive contacts of the first plurality of fuel cell stacks and configured to power an electrical load using the generated electric potential;

a negative electrical bus bar conductively coupled with the negative contacts of the second plurality of fuel cell stacks and configured to power electrical load using the generated electric potential; and a conduit spine that is elongated and extends between the first linear array of the first plurality of fuel cell stacks and the second linear array of the second plurality of fuel cell stacks, wherein the conduit spine is configured to direct air into the first plurality of fuel cell stacks and into the second plurality of fuel cell stacks, and wherein the conduit spine is configured to direct exhaust from the first plurality of fuel cell stacks and from the second plurality of fuel cell stacks away from the first plurality of fuel cell stacks and away from the second plurality of fuel cell stacks.

2. The system of claim 1, further comprising one or more high temperature air heat exchangers configured to exchange heat between the air directed into the first plurality of fuel cell stacks and into the second plurality of fuel cell stacks and the exhaust directed out of the first plurality of fuel cell stacks and out of the second plurality of fuel cell stacks.

3. The system of claim 1, wherein the conduit spine is configured to be fluidly coupled with one or more air blowers in order to direct the air into the first plurality of fuel cell stacks and into the second plurality of fuel cell stacks and direct the exhaust from the first plurality of fuel cell stacks and exhaust from the second plurality of fuel cell stacks away from the first plurality of fuel cell stacks and away from the second plurality of fuel cell stacks via the one or more air blowers.

4. The system of claim 1, further comprising:
one or more first reformers configured to reform input fuel that is input into the first plurality of fuel cell stacks; and
one or more second reformers configured to reform input fuel that is input into the second plurality of fuel cell stacks,
wherein the one or more first reformers are located on a first side of the conduit spine with the first plurality of fuel cell stacks, and
wherein the one or more second reformers are located on a second side of the conduit spine with the second plurality of fuel cell stacks.

5. The system of claim 4, wherein the one or more first reformers are configured to receive heat from the first plurality of fuel cell stacks, and wherein the one or more second reformers are configured to receive heat from the second plurality of fuel cell stacks.

6. The system of claim 1, further comprising one or more high temperature fuel heat exchangers configured to exchange heat between fuel directed into the first plurality of fuel cell stacks and directed into the second plurality of fuel cell stacks and fuel exhaust that is output by the first plurality of fuel cell stacks and fuel exhaust that is output by the second plurality of fuel cell stacks.

7. The system of claim 1, wherein the first plurality of fuel cell stacks and the second plurality of fuel cell stacks are disposed inside of a hotbox and are configured to receive input fuel from a location outside of the hotbox.

8. The system of claim 1, further comprising one or more stage one blocks comprising a first portion of the first plurality of fuel cell stacks and a first portion of the second plurality of fuel cell stacks and a stage two block comprising a second portion of the first plurality of fuel cell stacks and a second portion of the second plurality of fuel cell stacks, wherein the stage one blocks are configured to receive a first portion of fuel exhaust that is output from the first portion of the first plurality of fuel cell stacks and output from the first portion of the second plurality of fuel cell stacks of the stage one blocks, and the stage two block is configured to receive a second portion of fuel exhaust that is output from the first portion of the first plurality of fuel cell stacks and output from the first portion of the second plurality of fuel cell stacks of the one or more stage one blocks.

9. The system of claim 8, wherein the first plurality of fuel cell stacks and the second plurality of fuel cell stacks are configured to be fluidly coupled with a fuel blower in order to direct the first portion of fuel exhaust that is output from the first portion of the first plurality of fuel cell stacks and output from the first portion of the second plurality of fuel cell stacks of the one or more stage one blocks back into the first plurality of fuel cell stacks and into the second plurality of fuel cell stacks via the fuel blower.

10. The system of claim 8, further comprising one or more control valves fluidly coupled with the first plurality of fuel cell stacks and the second plurality of fuel cell stacks, wherein the one or more control valves are configured to control an amount of the first portion of fuel exhaust that is received by the one or more stage one blocks and an amount of the second portion of fuel exhaust that is received by the stage two block.

11. The system of claim 1, further comprising one or more air fuel heat exchangers configured to exchange heat between fuel directed into the first plurality of fuel cell stacks and into the second plurality of fuel cell stacks and air exhaust that is output by the first plurality of fuel cell stacks and air exhaust that is output by the second plurality of fuel cell stacks.

12. The system of claim 1, further comprising one or more tail gas oxidizers disposed inside of a hotbox and fluidly coupled with the first plurality of fuel cell stacks and the second plurality of fuel cell stacks, wherein the one or more tail gas oxidizers are configured to vent effluent that is output from the one or more tail gas oxidizers into the hotbox.

13. A method comprising: generating a first portion of an electric energy with positive contacts of a first plurality of fuel cell stacks arranged in a first linear array;
generating a second portion of the electric energy with negative contacts of a second plurality of fuel cell stacks arranged in a second linear array;
transferring the generated electric energy to an electrical load with a positive electrical bus bar conductively coupled with the positive contacts of the first plurality of fuel cell stacks, wherein the positive electrical bus bar is elongated and extends between the positive contacts of the first plurality of fuel cell stacks;
transferring the generated electric energy to the electrical load with a negative electrical bus bar conductively coupled with the negative contacts of the second plurality of fuel cell stacks, wherein the negative electrical bus bar is elongated and extends between the negative contacts of the second plurality of fuel cell stacks;
directing, with a conduit spine that is elongated and extends between the first linear array of the first plurality of fuel cell stacks and the second linear array of the second plurality of fuel cell stacks, air into the first plurality of fuel cell stacks and into the second plurality of fuel cell stacks; and
directing, with the conduit spine, exhaust from the first plurality of fuel cell stacks and from the second plurality of fuel cell stacks away from the first plurality of fuel cell stacks and away from the second plurality of fuel cell stacks.

14. The method of claim 13, further comprising:
reforming input fuel that is input into the first plurality of fuel cell stacks with one or more first reformers; and
reforming input fuel that is input into the second plurality of fuel cell stacks with one or more second reformers,
wherein the one or more first reformers are located on a first side of the conduit spine adjacent the first plurality of fuel cell stacks, and
wherein the one or more second reformers are located on a second side of the conduit spine adjacent the second plurality of fuel cell stacks.

15. A system comprising:
a positive electrical bus bar conductively coupled with positive contacts of each of a first plurality of fuel cell stacks arranged in a first linear array;
a negative electrical bus bar conductively coupled with negative contacts of each of a second plurality of fuel cell stacks arranged in a second linear array, wherein the positive and negative bus bars are configured to power an electrical load connected thereto; and
a conduit spine disposed between the first and second linear arrays and connected to the first plurality of fuel cell stacks and the second plurality of fuel cell stacks, wherein the conduit spine is configured to house a plurality of conduits fluidly coupled to the first plurality and second plurality of fuel cell stacks to direct air and fuel to and from the first plurality and second plurality of fuel cell stacks.

* * * * *